United States Patent
Tanaka

(10) Patent No.: US 10,516,837 B2
(45) Date of Patent: Dec. 24, 2019

(54) SHADING CORRECTION APPARATUS AND METHOD FOR OPERATING SHADING CORRECTION APPARATUS

(71) Applicant: FUJIFILM Corporation, Tokyo (JP)

(72) Inventor: Yasutake Tanaka, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 135 days.

(21) Appl. No.: 15/884,900

(22) Filed: Jan. 31, 2018

(65) Prior Publication Data

US 2018/0220087 A1 Aug. 2, 2018

(30) Foreign Application Priority Data

Feb. 1, 2017 (JP) ................................. 2017-016556

(51) Int. Cl.
| | |
|---|---|
| *G06K 9/00* | (2006.01) |
| *H04N 5/357* | (2011.01) |
| *H04N 9/04* | (2006.01) |
| *H04N 1/401* | (2006.01) |
| *H04N 1/407* | (2006.01) |
| *H04N 1/60* | (2006.01) |

(52) U.S. Cl.
CPC ........... *H04N 5/3572* (2013.01); *H04N 1/401* (2013.01); *H04N 1/4076* (2013.01); *H04N 9/045* (2013.01); *H04N 1/60* (2013.01)

(58) Field of Classification Search
None
See application file for complete search history.

(56) References Cited

U.S. PATENT DOCUMENTS

| | | | | |
|---|---|---|---|---|
| 5,929,417 A | * | 7/1999 | Hayashi | ............... H04N 1/6027 235/454 |
| 6,646,678 B1 | | 11/2003 | Kobayashi | |
| (Continued) | | | | |

FOREIGN PATENT DOCUMENTS

| | | |
|---|---|---|
| JP | 2000-180922 A | 6/2000 |
| JP | 2003-315944 A | 11/2003 |
| JP | 2005-354357 A | 12/2005 |

OTHER PUBLICATIONS

English machine translation of 2016-163728 JP (Year: 2016).*
Japanese Office Action and English translation dated Nov. 12, 2019, for Japanese Application No. 2017-016556.

*Primary Examiner* — Hadi Akhavannik
(74) *Attorney, Agent, or Firm* — Birch, Stewart, Kolasch & Birch, LLP

(57) ABSTRACT

A correction plate has the same plane size as a small region obtained by equally dividing an image detection region. In addition, the correction plates whose number is equal to the number of small regions are prepared. In a maintenance mode, a plurality of correction plates are laid in the image detection region such that the entire image detection region is covered with the plurality of correction plates. In this state, scanning is performed and a correction image signal obtained by detecting fluorescent light from the correction plate is output. An acquisition unit of a console acquires a correction image signal and a creation unit creates a correction image on the basis of the correction image signal. A correction unit performs shading correction on the basis of the correction image.

13 Claims, 19 Drawing Sheets

(56) References Cited

U.S. PATENT DOCUMENTS

| | | | |
|---|---|---|---|
| 2002/0021456 A1* | 2/2002 | Toriyama | H04N 1/401 |
| | | | 358/446 |
| 2005/0274918 A1 | 12/2005 | Arakawa | |
| 2018/0061085 A1* | 3/2018 | Ikami | G06T 5/50 |

* cited by examiner

FIG. 12

| | THIRD FLUORESCENCE CHARACTERISTIC VALUE INFORMATION | |
|---|---|---|
| 86C | SECOND FLUORESCENCE CHARACTERISTIC VALUE INFORMATION | |
| 86 — 86B | FIRST FLUORESCENCE CHARACTERISTIC VALUE INFORMATION | |
| 86A | NUMBER | CHARACTERISTIC VALUE |
| | 11 | FV-A(11) |
| | 12 | FV-A(12) |
| | 13 | FV-A(13) |
| | 14 | FV-A(14) |

SHADING CORRECTION APPARATUS AND METHOD FOR OPERATING SHADING CORRECTION APPARATUS

CROSS-REFERENCE TO RELATED APPLICATION

This application claims priority under 35 USC 119 from Japanese Patent Application No. 2017-016556, filed 1 Feb. 2017, the disclosure of which is incorporated by reference herein.

BACKGROUND OF THE INVENTION

1. Field of the Invention

The present invention relates to a shading correction apparatus and a method for operating the shading correction apparatus.

2. Description of the Related Art

An image reading apparatus has been known which includes an excitation light source that irradiates an image carrier, which carries image information and includes a fluorescent material, with excitation light, and a detection unit that detects fluorescence image on the basis of fluorescent light emitted from the fluorescent material excited by the excitation light. The image carrier includes a material obtained by fluorescently labeling a biological material, such as deoxyribonucleic acid (DNA), ribonucleic acid (RNA), or protein, as a sample with a fluorescent pigment and fluorescent protein that has fluorescent properties caused by gene expression.

In the image reading apparatus, in some cases, shading which is density unevenness caused by the configuration of the apparatus occurs in a fluorescence image. In the related art, a technique which corrects the shading has been proposed. A dedicated correction plate is used to correct the shading. The correction plate includes a fluorescent material having the wavelength characteristics in which an excitation wavelength band and an emission wavelength band at least partially overlap an excitation wavelength band and an emission wavelength band of the fluorescent material in the image carrier, respectively.

For example, JP2003-315944A discloses an image reading apparatus that uses one flat plate as a correction plate. The correction plate disclosed in JP2003-315944A has a plane size that is substantially equal to the plane size of an image detection region which is irradiated with excitation light from an excitation light source and in which fluorescent light is detected by a detection unit.

The correction plate disclosed in JP2003-315944A which has a plane size substantially equal to the plane size of the image detection region has a relatively large plane size. Therefore, the correction plate is likely to warp and the warpage state of the correction plate is likely to change depending on a usage environment. In addition, fluorescence characteristics in the plane are likely to be non-uniform. In a case in which the correction plate warps, the warpage state of the correction plate changes, or the fluorescence characteristics in the plane are non-uniform, it is difficult to accurately perform shading correction.

SUMMARY OF THE INVENTION

An object of the invention is to provide a shading correction apparatus that can accurately perform shading correction and a method for operating the shading correction apparatus.

In order to solve the above-mentioned problems, according to the invention, there is provided a shading correction apparatus that is used for an image reading apparatus including an excitation light source that irradiates an image carrier, which carries image information and includes a fluorescent material, with excitation light in an image detection region, and a detection unit that detects a fluorescence image on the basis of fluorescent light emitted from the fluorescent material excited by the excitation light, and corrects shading which is density unevenness in the fluorescence image detected by the detection unit. The shading correction apparatus comprises: a flat-plate-shaped correction plate that has a wavelength characteristic in which an excitation wavelength band and an emission wavelength band at least partially overlap an excitation wavelength band and an emission wavelength band of the fluorescent material, respectively, and has a plane size corresponding to a plurality of small regions in the image detection region; an acquisition unit that acquires a correction image signal detected by the detection unit in a state in which the correction plate is disposed in the corresponding small region in the image detection region; a creation unit that creates a correction image on the basis of the correction image signal of each small region in the image detection region; and a correction unit that performs shading correction for the fluorescence image on the basis of the correction image.

Preferably, the image detection region is equally divided into the small regions.

Preferably, the correction image is created from the correction image signal of each small region obtained by irradiating the correction plate disposed in each small region with the excitation light.

Preferably, the correction image is created from the correction image signal of each small region obtained by moving the correction plates whose number is less than the number of small regions from an initial position one or more times and irradiating the correction plates with the excitation light at the initial position and the moved positions.

Preferably, in a case in which there are a plurality of the correction plates, fluorescence characteristic values of the plurality of correction plates are stored in a storage unit in advance and the creation unit divides the correction image signal of each small region by the characteristic value of the corresponding correction plate to correct a variation in the fluorescence characteristics of the plurality of correction plates and creates the correction image.

Preferably, the creation unit performs interpolation or extrapolation with the correction image signal of each small region to create the correction image.

Preferably, the creation unit creates the correction image and stores the correction image in the storage unit before the shading correction is performed. Preferably, in a case in which the shading correction is performed, the correction unit reads out the correction image from the storage unit.

Preferably, the correction plate has the same plane size as the small region and is laid in the image detection region. Alternatively, preferably, the correction plate has a smaller plane size than the small region. In addition, preferably, the shading correction apparatus further includes a holding frame that holds the correction plate and is provided in the image detection region.

Preferably, the correction plate has an index indicating the up, down, left, and right sides of the correction plate and the front and rear sides of the correction plate. In addition, preferably, the number of small regions is equal to or greater than 9.

According to the invention, there is provided a method for operating a shading correction apparatus that is used for an image reading apparatus including an excitation light source that irradiates an image carrier, which carries image information and includes a fluorescent material, with excitation light in an image detection region, and a detection unit that detects a fluorescence image on the basis of fluorescent light emitted from the fluorescent material excited by the excitation light, and corrects shading which is density unevenness in the fluorescence image detected by the detection unit. The method comprises: an acquisition step of acquiring a correction image signal detected by the detection unit in a state in which a flat-plate-shaped correction plate, which has a wavelength characteristic in which an excitation wavelength band and an emission wavelength band at least partially overlap an excitation wavelength band and an emission wavelength band of the fluorescent material, respectively, and has a plane size corresponding to a plurality of small regions in the image detection region, is disposed in the corresponding small region in the image detection region; a creation step of creating a correction image on the basis of the correction image signal of each small region in the image detection region; and a correction step of performing shading correction for the fluorescence image on the basis of the correction image.

According to the invention, the correction plate with a plane size corresponding to a plurality of small regions in the image detection region of the fluorescence image is used. Therefore, in a case in which the correction plates have the same thickness and hardness, the correction plate is less likely to warp than a correction plate with a plane size that is substantially equal to the plane size of the image detection region and the warpage state is less likely to change depending on a usage environment. In addition, fluorescence characteristics in the plane are less likely to be non-uniform. Therefore, it is possible to provide a shading correction apparatus that can accurately perform shading correction and a method for operating the shading correction apparatus.

BRIEF DESCRIPTION OF THE DRAWINGS

FIG. 12 is a diagram illustrating fluorescence characteristic value information.

DESCRIPTION OF THE PREFERRED EMBODIMENTS

First Embodiment

Figure 1:
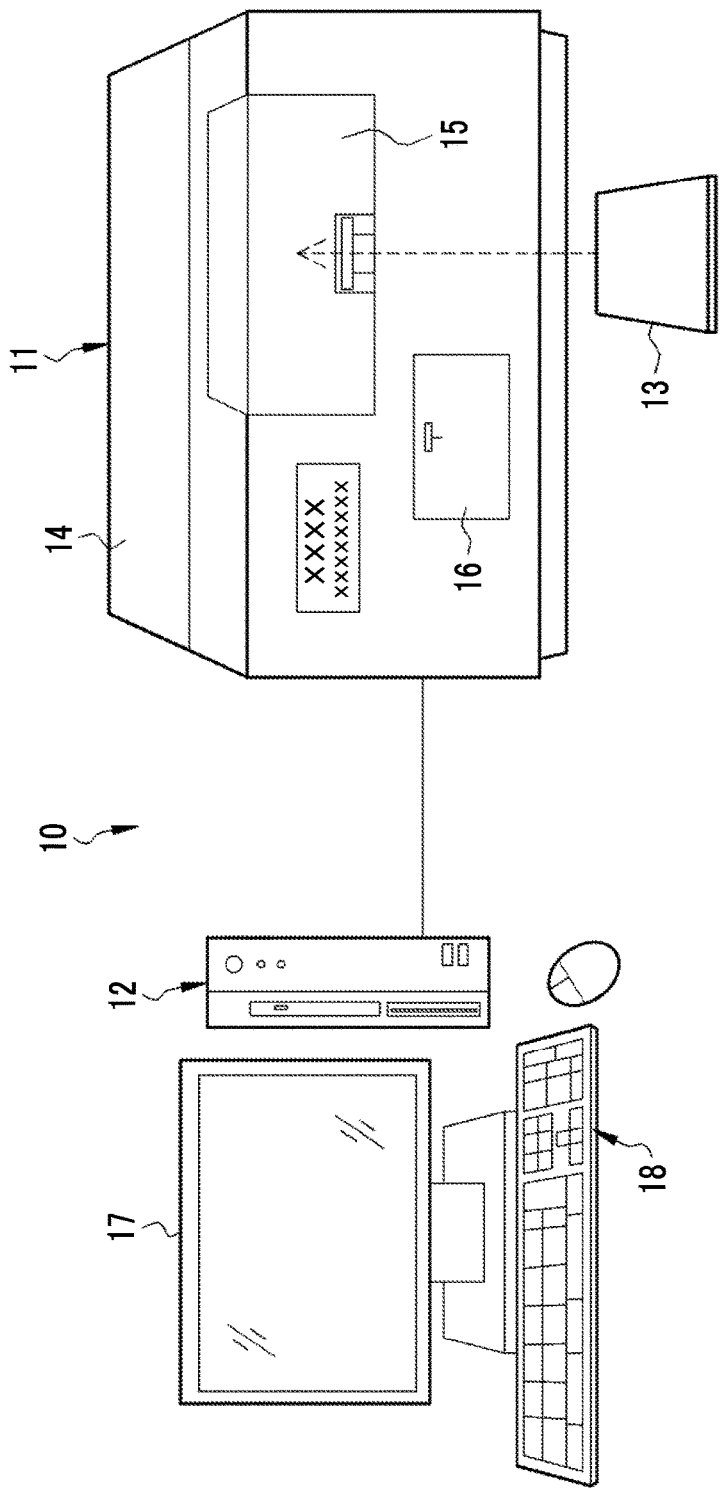
FIG. 1 is a diagram illustrating an image detection system.

In FIG. 1, an image detection system 10 includes an image reading apparatus 11 and a console 12 that forms a shading correction apparatus together with a correction plate 65 (see FIG. 5) which will be described below. The image reading apparatus 11 and the console 12 are connected to each other by, for example, a universal serial bus (USB) communication cable such that they can exchange data.

The image reading apparatus 11 detects fluorescent light FL (see FIG. 2) from an image carrier 13 carrying image information and outputs a fluorescence image based on the detected fluorescent light FL. The image carrier 13 is a gel support or a transfer support on which an electrophoresis pattern of a biological material, such as DNA, RNA, or protein, as a sample or a biological material including fluorescent protein that has fluorescent properties caused by gene expression is recorded or a cell or a living tissue including the fluorescent protein.

The biological material is fluorescently labeled by a fluorescent pigment. In addition, the fluorescent protein has fluorescent properties. Therefore, the fluorescent light FL to be detected is emitted from a fluorescent material such as a fluorescent pigment or fluorescent protein. There are a plurality of kinds of fluorescent materials which have different excitation wavelengths and emission wavelengths.

For example, a fluorescent pigment C2 is excited by blue excitation light which will be described below and emits blue fluorescent light with a longer wavelength than the blue excitation light. A fluorescent pigment C3 is excited by green excitation light which will be described below and emits green fluorescent light with a longer wavelength than the green excitation light. A fluorescent pigment C5 is excited by red excitation light which will be described below and emits red fluorescent light with a longer wavelength than the red excitation light. The fluorescent pigment C2 is, for example, Cy2 (registered trademark). The fluorescent pigment C3 is, for example, Cy3 (registered trademark). The fluorescent pigment C5 is, for example, Cy5 (registered trademark). For example, in the case of green fluorescent protein (GFP), the fluorescent protein is excited by blue excitation light and emits green fluorescent light. In addition, for example, the following fluorescent protein has been known: yellow fluorescent protein (YFP) that is excited by green excitation light and emits yellow-green fluorescent light; and red fluorescent protein (RFP) that is excited by orange excitation light and emits red fluorescent light.

The entire image reading apparatus 11 is covered by a housing 14. The housing 14 shields the inside of the image reading apparatus 11 from external light that becomes noise in the detection of the fluorescent light FL. An openable and closable cover 15 for setting the image carrier 13 in the image reading apparatus 11 is provided on the front surface of the housing 14. In addition, reference numeral 16 indicates an openable and closable cover for replacing a filter unit 30 (see FIG. 2).

The console 12 is, for example, a desktop personal computer and includes a display 17 and an operation unit 18 including a keyboard and a mouse. The display 17 displays a screen that is used to operate the operation unit 18. The screen used for an operation forms a graphical user interface (GUI). The console 12 receives an operation command that is input from the operation unit 18 through the screen of the display 17.

Figure 2:
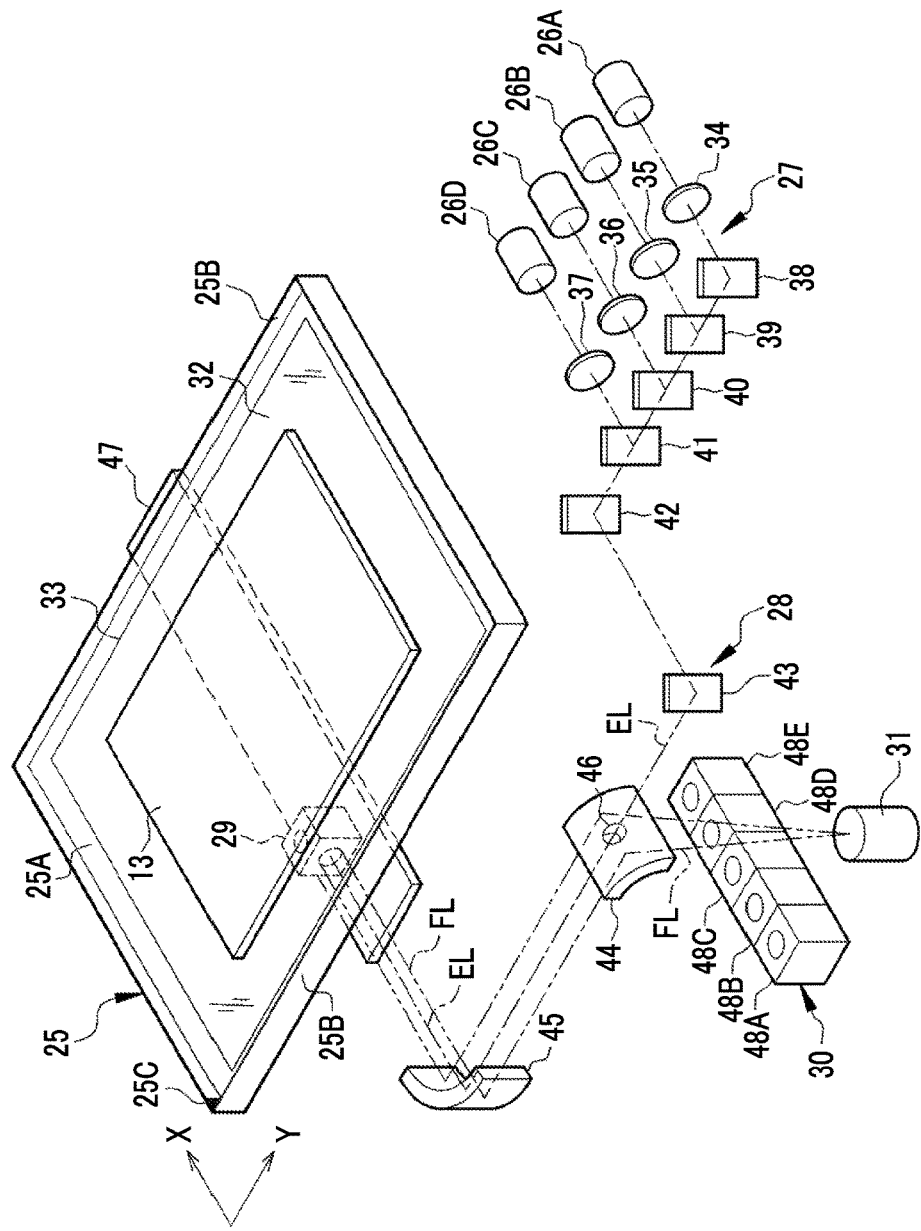
FIG. 2 is a diagram schematically illustrating an image reading apparatus.

In FIG. 2, the image reading apparatus 11 is provided with a stage 25, excitation light sources 26A, 26B, 26C, and 26D, a light source optical system 27, a light guide optical system 28, an optical head 29, a filter unit 30, and a photomultiplier 31 corresponding to a detection unit.

The stage 25 holds the image carrier 13. The stage 25 has a bottom 25A that has a box shape surrounded by four side surfaces 25B. A mark 25C for positioning with a holding frame 66 (see FIG. 5) is formed at one of four corners where the side surfaces 25B intersect each other.

Most of the bottom 25A is a rectangular opening and a transparent glass plate 32 is fitted to the opening. Therefore, in the glass plate 32, a plane size which is the area of the XY plane formed by a main scanning direction X and a sub-scanning direction Y is slightly less than the size of the bottom 25A. The image carrier 13 is placed on the glass plate 32.

A rectangular region delimited by the frame of the glass plate 32 corresponds to an image detection region 33 (see FIG. 5) that is irradiated with excitation light by the optical head 29 and detects fluorescent light. In the image detection region 33, for example, the length of a side along the main scanning direction X is 400 mm and the length of a side along the sub-scanning direction Y is 460 mm. As illustrated in FIG. 2, there is an image carrier 13 having a smaller plane size than the image detection region 33. In addition, there is an image carrier 13 (not illustrated) having a plane size that is equal to or slightly less than that of the image detection region 33. In any case, the image carrier 13 does not protrude from the image detection region 33.

The excitation light sources 26A to 26D emit the excitation light EL (represented by a one-dot chain line) of a fluorescent material. The excitation light sources 26A to 26D having different emission wavelength bands of the excitation light EL are prepared in order to respond to a plurality of kinds of fluorescent materials.

Specifically, the excitation light source 26A emits infrared excitation light with a center wavelength of 770 nm to 800 nm, for example, a center wavelength of 785 nm. The excitation light source 26B emits red excitation light with a center wavelength of 650 nm to 690 nm, for example, a center wavelength of 685 nm. The excitation light source 26C emits green excitation light with a center wavelength of 520 nm to 540 nm, for example, a center wavelength of 532 nm. The excitation light source 26D emits blue excitation light with a center wavelength of 460 nm to 490 nm, for example, a center wavelength of 473 nm. The excitation light sources 26A, 26B, and 26D are, for example, semiconductor lasers and the excitation light source 26C is, for example, a second harmonic generation element.

The center wavelength is the wavelength of the center of the width (half width) of half of the maximum intensity of the emission spectrum of excitation light. Hereinafter, in some cases, the excitation light source 26A is referred to as an infrared excitation light source 26A, the excitation light source 26B is referred to as a red excitation light source 26B, the excitation light source 26C is referred to as a green excitation light source 26C, and the excitation light source 26D is referred to as a blue excitation light source 26D. In addition, in some cases, the excitation light sources 26A to 26D are collectively referred to as excitation light sources 26.

The emission wavelength band of the excitation light EL is not limited to the above. For example, the red excitation light source 26B may emit red excitation light with a center wavelength of 653 nm or a center wavelength of 655 nm, in addition to or instead of emitting the red excitation light with a center wavelength of 685 nm. In addition, the red excitation light source 26B may emit red excitation light with a center wavelength of 625 nm to 645 nm, for example, a center wavelength of 635 nm, in addition to emitting the red excitation light with a center wavelength of 650 nm to 690 nm. The blue excitation light source 26D may emit blue excitation light with a center wavelength of 488 nm, in addition to or instead of emitting the blue excitation light with a center wavelength of 473 nm. As such, the number of excitation light sources is not limited to 4 and may be 2 or 5 or more.

The light source optical system 27 includes collimator lenses 34, 35, 36, and 37, mirrors 38 and 42, and dichroic mirrors 39, 40, and 41. The collimator lenses 34 to 37 are provided on the front surfaces of the excitation light sources 26A to 26D and collimate the excitation light components of each color emitted from the excitation light sources 26A to 26D, respectively. The mirror 38 reflects the infrared excitation light collimated by the collimator lens 34 to the dichroic mirror 39.

The dichroic mirror 39 transmits the infrared excitation light from the mirror 38 and reflects the red excitation light collimated by the collimator lens 35 to the dichroic mirror 40. The dichroic mirror 40 transmits the infrared excitation light from the mirror 38 and the red excitation light from the dichroic mirror 39 and reflects the green excitation light collimated by the collimator lens 36 to the dichroic mirror 41. The dichroic mirror 41 transmits the infrared excitation light from the mirror 38, the red excitation light from the dichroic mirror 39, and the green excitation light from the dichroic mirror 40 and reflects the blue excitation light collimated by the collimator lens 37 to the mirror 42.

The mirror 42 reflects the infrared excitation light which has been reflected by the mirror 38 and then transmitted through the dichroic mirrors 39 to 41, the red excitation light which has been reflected by the dichroic mirror 39 and then transmitted through the dichroic mirrors 40 and 41, the green excitation light which has been reflected by the dichroic mirror 40 and then transmitted through the dichroic mirror 41, and the blue excitation light which has been reflected by the dichroic mirror 41 to the light guide optical system 28.

The light guide optical system 28 includes a mirror 44, a perforated concave mirror 44, and a concave mirror 45. The mirror 44 reflects the excitation light EL from the mirror 42 of the light source optical system 27 to the perforated concave mirror 44. The perforated concave mirror 44 has a through hole 46 provided at the center. The excitation light EL from the mirror 43 is transmitted through the through hole 46 and travels toward the concave mirror 45. The concave mirror 45 reflects the excitation light EL transmitted through the through hole 46 to the optical head 29.

In addition, the fluorescent light FL (represented by a two-dot chain line) emitted from the optical head 29 is incident on the concave mirror 45. The concave mirror 45 reflects the fluorescent light FL to the perforated concave mirror 44. The perforated concave mirror 44 reflects the fluorescent light FL from the concave mirror 45 to the filter unit 30. As such, the perforated concave mirror 44 transmits the excitation light EL through the through hole 46 and reflects the fluorescent light FL to the filter unit 30 to branch the optical path of the excitation light EL and the fluorescent light FL.

The optical head 29 emits the excitation light EL to the image carrier 13 and acquires the fluorescent light FL from the image carrier 13. The optical head 29 is disposed on a substrate 47 which is an elongated plate and is provided below the stage 25. The optical head 29 can be moved on the substrate 47 in the main scanning direction X by, for example, a motor (not illustrated) or a rail (not illustrated). In addition, the substrate 47 and the concave mirror 45 can be moved in the sub-scanning direction Y by, for example, a motor (not illustrated) or a rail (not illustrated). That is, the optical head 29 can be moved in the main scanning direction X and the sub-scanning direction Y to scan the entire surface of the image detection region 33 with the excitation light EL and to acquire the fluorescent light FL from the image detection region 33. In addition, the optical head 29 may be fixed and the stage 25 may be moved in the main scanning direction X and the sub-scanning direction Y. That is, the optical head 29 may be configured so as to be moved with respect to the stage 25.

The filter unit 30 is located on the optical path of the fluorescent light FL between the perforated concave mirror 44 and the photomultiplier 31. The filter unit 30 includes five filters 48A, 48B, 48C, 48D, and 48E which are arranged in the main scanning direction X.

The filter unit 30 can be moved in the main scanning direction X by, for example, a motor (not illustrated) or a rail (not illustrated), similarly to the optical head 29. Therefore, any one of the filters 48A to 48E is selectively disposed between the perforated concave mirror 44 and the photomultiplier 31. Specifically, in a case in which the image carrier 13 is a gel support or a transfer support, any one of the filters 48A to 48D is disposed between the perforated concave mirror 44 and the photomultiplier 31. In a case in which the image carrier 13 is a stimulable phosphor sheet, the filter 48E is disposed between the perforated concave mirror 44 and the photomultiplier 31.

The fluorescent light FL from the image carrier 13 includes a little amount of excitation light EL. The excitation light EL is noise that is unnecessary to generate a fluorescence image. Therefore, the filters 48A to 48E have the characteristic that they cut the excitation light EL and transmit the fluorescent light FL.

The filters 48A to 48D having different transmission wavelength bands are prepared in order to respond to a plurality of kinds of fluorescent materials, similarly to the excitation light sources 26A to 26D. Specifically, the filter 48A cuts light (infrared excitation light) with a wavelength equal to or less than 785 nm and transmits light (infrared fluorescent light) with a wavelength greater than 785 nm. The filter 48B cuts light (red excitation light) with a wavelength equal to or less than 685 nm and transmits light (red fluorescent light) with a wavelength greater than 685 nm. The filter 48C cuts light (green excitation light) with a wavelength equal to or less than 532 nm and transmits light (green fluorescent light) with a wavelength greater than 532 nm. The filter 48D cuts light (blue excitation light) with a wavelength equal to or less than 473 nm and transmits light (blue fluorescent light) with a wavelength greater than 473 nm.

Hereinafter, in some cases, the filter 48A is referred to as an infrared filter 48A, the filter 48B is referred to as a red filter 48B, the filter 48C is referred to as a green filter 48C, and the filter 48D is referred to as a blue filter 48D. Furthermore, in some cases, the filters 48A to 48E are collectively referred to as filters 48. Similarly to the emission wavelength band of the excitation light EL, the transmission wavelength band of the filter is not limited to the above. The number of filters is not limited to 5 and may be 2 or 6 or more.

The fluorescent light FL transmitted through the filters 48A to 48E is incident on the photomultiplier 31. The photomultiplier 31 photoelectrically detects the fluorescent light FL at a predetermined time and outputs an analog image signal corresponding to the detected fluorescent light FL. The image signal indicates a fluorescence image based on the fluorescent light FL. That is, the photomultiplier 31 detects the fluorescence image based on the fluorescent light FL.

Figure 3:
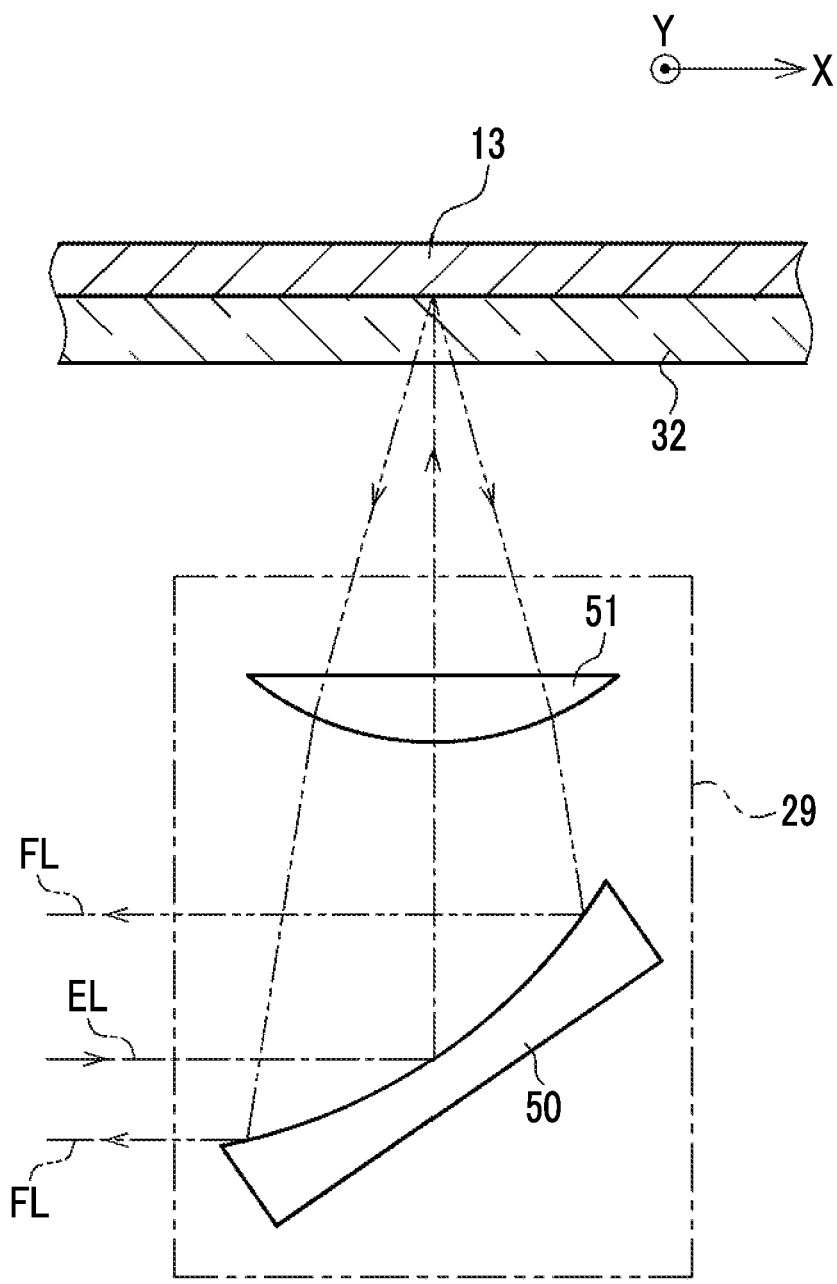
FIG. 3 is a diagram schematically illustrating an optical head.

As illustrated in FIG. 3, the optical head 29 is provided with a concave mirror 50 and an aspheric lens 51. The concave mirror 50 reflects the excitation light EL incident from the concave mirror 45 of the light guide optical system 28 to the aspheric lens 51. The aspheric lens 51 condenses the excitation light EL from the concave mirror 50 on a surface (a surface coming into contact with the glass plate 32) of the image carrier 13 placed on the glass plate 32. In addition, the aspheric lens 51 condenses the fluorescent light FL which is emitted from the image carrier 13 irradiated with the excitation light EL such that the fluorescent light FL is incident on the concave mirror 50. The concave mirror 50 further condenses the fluorescent light FL from the aspheric lens 51 such that the fluorescent light FL is incident as substantially parallel light on the concave mirror 45 of the light guide optical system 28.

Figure 4:
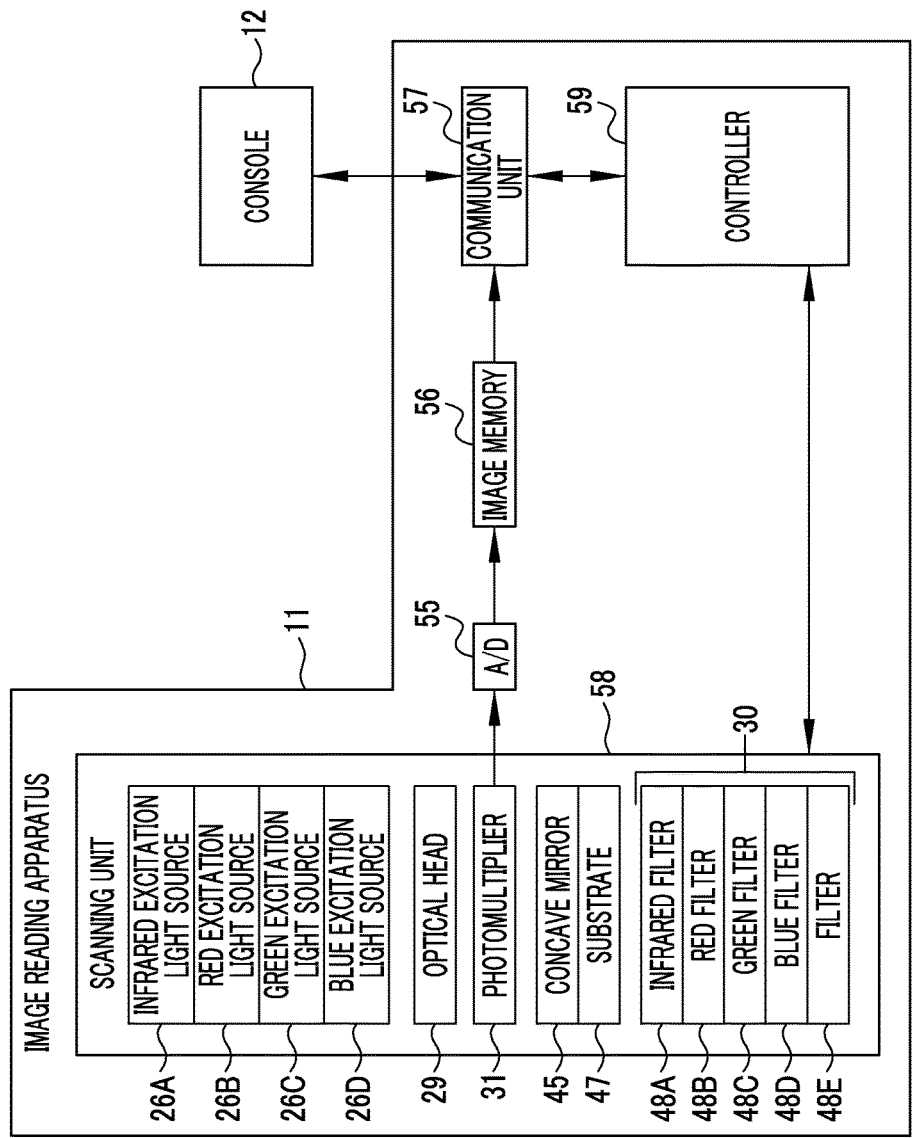
FIG. 4 is a block diagram illustrating the image reading apparatus.

In FIG. 4, an analog/digital (A/D) converter (A/D) 55 is connected to the photomultiplier 31. The A/D 55 sequentially converts analog image signals which are sequentially output from the photomultiplier 31 at a predetermined time into digital image signals. The A/D 55 outputs the digital image signals to an image memory 56. The image memory 56 stores a digital image signal (fluorescence image) corresponding to one frame which is obtained by one scanning operation of the optical head 29 for the entire surface of the image carrier 13.

A communication unit 57 is connected to the image memory 56. The communication unit 57 is a USB communication interface and performs the communication of various kinds of data with the console 12. The communication unit 57 receives the fluorescence image from the image memory 56 and transmits the fluorescence image to the console 12.

The excitation light sources 26A to 26D, the optical head 29, the photomultiplier 31, the concave mirror 45, the substrate 47, and the filters 48A to 48E (filter unit 30) form a scanning unit 58 that is driven in order to output the fluorescence image of the image carrier 13. A controller 59 controls the overall operation of each unit, such as the scanning unit 58 or the communication unit 57. In particular, the scanning unit 58 performs scanning under the control of the controller 59.

The image reading apparatus 11 has two modes, that is, a normal mode and a maintenance mode. In the normal mode, the fluorescent light FL from the image carrier 13 is detected and a fluorescence image based on the detected fluorescent light FL is output. The normal mode is usually selected. In contrast, for example, the maintenance mode is selected when the image reading apparatus 11 starts every day.

Herein, shading is likely to occur in the fluorescence image. The shading is density unevenness that occurs in the entire fluorescence image. The shading is caused by the configuration of the image reading apparatus 11. Specifically, the shading is caused by a change in the length of the optical path of the fluorescent light FL which is caused by, for example, a change in the distance between the optical head 29 and the concave mirror 45 in the main scanning direction X, a change in the distance between the concave mirror 45 and the perforated concave mirror 44 in the sub-scanning direction Y, a variation in the distance between the substrate 47 and the concave mirror 45 in the sub-scanning direction Y, or a variation in the distance between the stage 25 and the optical head 29 (aspheric lens 51). The maintenance mode is used to correct the shading.

Figure 5:
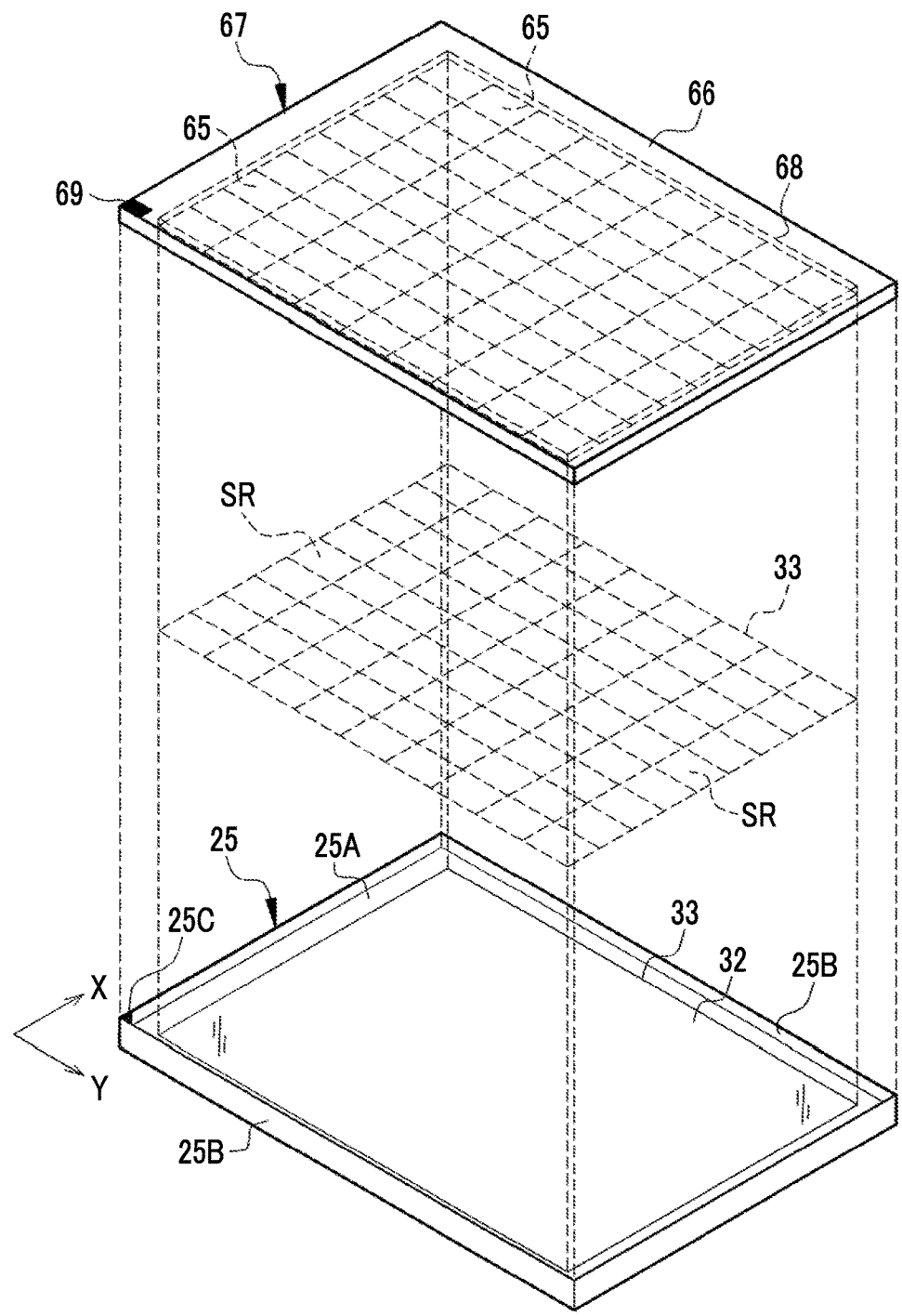
FIG. 5 is a perspective view illustrating a correction plate, a holding frame, and a stage.

As illustrated in FIG. 5, in the maintenance mode, instead of the image carrier 13, a correction plate unit 67 including a plurality of flat-plate-shaped correction plates 65 and the holding frame 66 for holding the plurality of correction plates 65 is set on the stage 25. Then, similarly to the image carrier 13, the optical head 29 scans the correction plates 65, detects the fluorescent light FL from the correction plates 65, and outputs a correction image signal FF (see FIG. 7) on the basis of the detected fluorescent light FL.

The correction plate 65 includes a fluorescent material having the wavelength characteristics in which an excitation wavelength band and an emission wavelength band at least partially overlap the excitation wavelength band and the emission wavelength band of the fluorescent material included in the image carrier 13. That is, in a case in which the correction plate 65 is irradiated with the excitation light EL having the same wavelength band as that emitted to the image carrier 13, the fluorescent light FL having the same wavelength band as that emitted from the fluorescent material included in the image carrier 13 is emitted from the correction plate 65.

The correction plate 65 includes, for example, an organic fluorescent material and a binder in which the organic fluorescent material is dispersed. The organic fluorescent material is, for example, a phthalocyanine-based pigment or an anthraquinone-based pigment. The binder is, for example, is any one of a vinyl chloride resin, a polycarbonate resin, a methacrylic resin, a silicone resin, and a polyacrylamide resin. The correction plate is obtained by mixing the organic fluorescent material with a solution of the resin, uniformly dispersing the organic fluorescent material, and pouring the solution in a plate-shaped mold, and solidifying the solution. The fluorescent material included in the correction plate 65 is not limited to the organic fluorescent material and may be an inorganic fluorescent material such as a cerium-activated yttrium aluminum garnet (YAG) phosphor (YAG:Ce). That is, the organic fluorescent material may have the wavelength characteristics in which an excitation wavelength band and an emission wavelength band at least partially overlap the excitation wavelength band and the emission wavelength band of the fluorescent material included in the image carrier 13.

In this example, the correction plate 65 has a plane size corresponding to a plurality of small regions SR in the image detection region 33, specifically, the small regions SR obtained by equally dividing the image detection region 33 in the main scanning direction X and the sub-scanning direction Y. The correction plate 65 has the same plane size as the small region SR. Since the small region SR has a rectangular shape, the correction plate 65 having the same plane size as the small region SR also has a rectangular shape.

The correction plates 65 whose number is equal to the number of small regions SR are prepared. In this example, the image detection region 33 is equally divided into 81 (=9×9) small regions SR. Therefore, 81 correction plates 65 are prepared.

Figure 6:
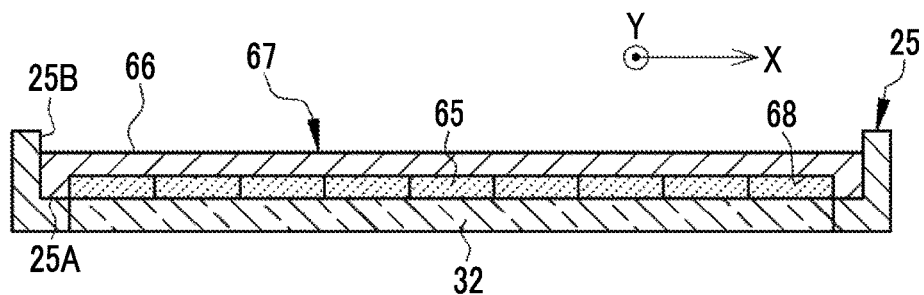
FIG. 6 is a cross-sectional view illustrating the correction plate, the holding frame, and the stage.

As illustrated in FIG. 6, the holding frame 66 has the same outer size as the bottom 25A of the stage 25. In the holding frame 66, a concave portion 68 in which the plurality of correction plates 65 are accommodated is formed in a portion corresponding to the image detection region 33. The correction plates 65 are laid in the concave portion 68 (are arranged without any gap therebetween) and are fixed to the concave portion 68 by, for example, an adhesive. The holding frame 66 is set on the stage 25, with the correction plates 65 facing down, such that the correction plates 65 come into contact with the glass plate 32 while the correction plates 65 are held in the concave portion 68. As described above, the correction plates 65 which have the same plane size as the small regions SR and whose number is equal to the number of small regions SR are prepared. Therefore, in a case in which the correction plate unit 67 is set on the stage 25, the plurality of correction plates 65 are laid in the image detection region 33 and the entire image detection region 33 is covered with the plurality of correction plates 65.

A mark 69 for aligning an attachment position to the stage 25 is formed at one of four corners of the holding frame 66. The holding frame 66 is provided on the stage 25 such that the mark 69 is matched with the mark 25C formed in the stage 25. With this configuration, the same correction plates 65 are disposed in each small region SR.

It is preferable that the holding frame 66 is made of a material with a relatively high rigidity in order to prevent a variation in density caused by the warpage of the concave portion 68 from being included as noise in the correction image signal FF in a case in which the concave portion 68 warps. Examples of the material with high rigidity include metal, such as aluminum and titanium, an alloy, such as stainless steel, carbon, and ceramics.

Figure 7:
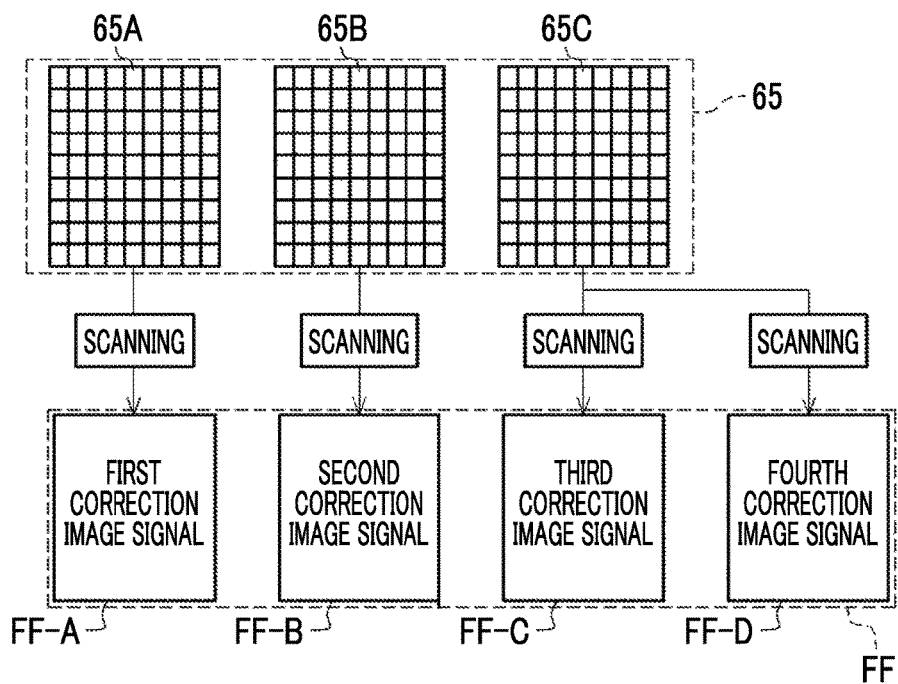
FIG. 7 is a diagram illustrating an aspect in which scanning is performed for first to third correction plates to obtain first to fourth correction image signals.

As illustrated in FIG. 7, there are a plurality of types of correction plates 65 corresponding to excitation light. That is, there are three types of correction plates, that is, a first correction plate 65A, a second correction plate 65B, and a third correction plate 65C. The first correction plate 65A is for infrared excitation light with a center wavelength of 770 nm to 800 nm, the second correction plate 65B is for red excitation light with a center wavelength of 650 nm to 690 nm, and the third correction plate 65C is for green excitation light with a center wavelength of 520 nm to 540 nm and blue excitation light with a center wavelength of 460 nm to 490 nm.

The holding frames 66 are separately prepared for the correction plates 65A to 65C. Therefore, there are three types of correction plate units 67, that is, a first correction plate unit 67A (not illustrated) in which the first correction plates 65A are held by the holding frame 66, a second correction plate unit 67B (not illustrated) in which the second correction plates 65B are held by the holding frame 66, and a third correction plate unit 67C (not illustrated) in which the third correction plates 65C are held by the holding frame 66.

In the maintenance mode, scanning can be performed for the correction plates 65 to acquire the correction image signal FF. Specifically, scanning is performed for the first correction plates 65A with the infrared excitation light source 26A to acquire a first correction image signal FF-A. In addition, scanning is performed for the second correction plates 65B with the red excitation light source 26B to acquire a second correction image signal FF-B. Scanning is performed for the third correction plates 65C with the green excitation light source 26C and the blue excitation light source 26D to acquire a third correction image signal FF-C and a fourth correction image signal FF-D, respectively.

Figure 8:
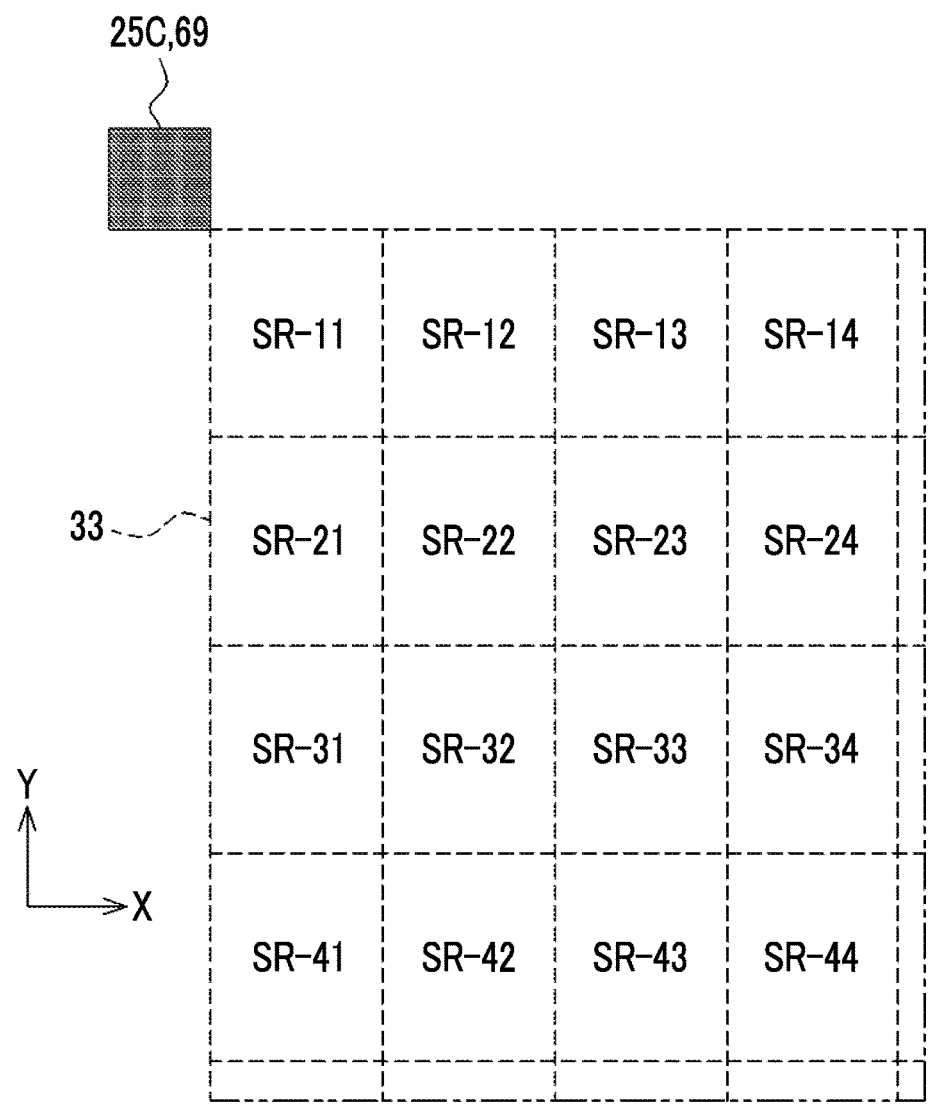
FIG. 8 is a diagram illustrating the position of small regions.

In the following description, as illustrated in FIG. 8, a number MN (M=N=1 to 9) indicating the position of the small region SR is added to the end of letters SR to distinguish the small regions SR. For the number MN, "11" is a reference position facing the marks 25C and 68. Hereinafter, 1 is sequentially added to the first digit (N) from the right in the main scanning direction X and 1 is sequentially added to the second digit (M) from the right in the sub-scanning direction Y.

Figure 9:
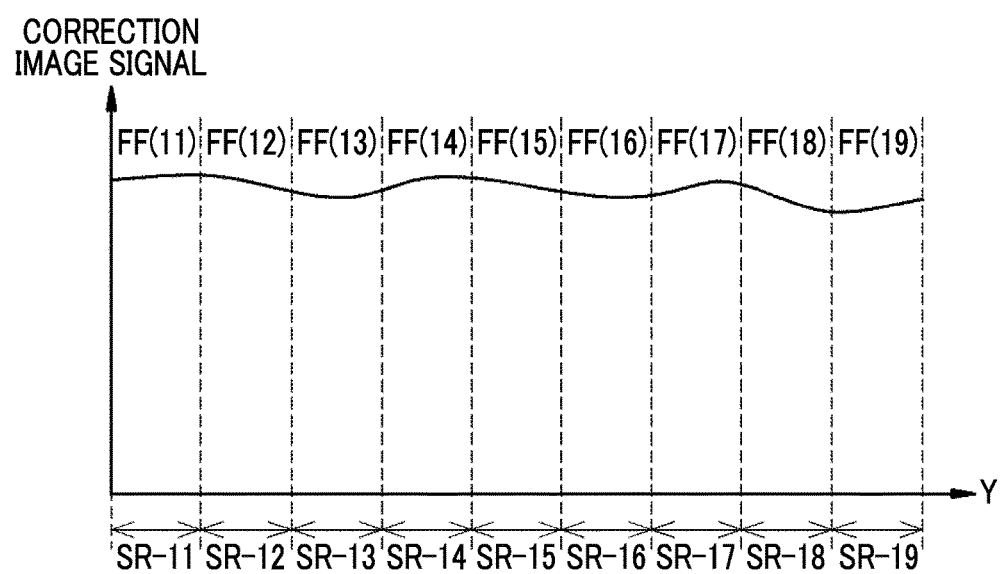
FIG. 9 is a graph illustrating a change in a correction image signal.

FIG. 9 is a graph illustrating a change (density profile) in the correction image signal FF in the first row of the small regions SR-1N (N=1 to 9). As such, excitation light is emitted to each correction plate 65 provided in each small region SR and fluorescent light excited by the excitation light is detected to obtain the correction image signal FF for each small region SR in the image detection region 33. In this example, a representative value of the correction image signal FF for each small region SR is calculated and interpolation or extrapolation is performed with the representative value to create a correction image 87 (see FIG. 11) used to correct shading.

Figure 10:
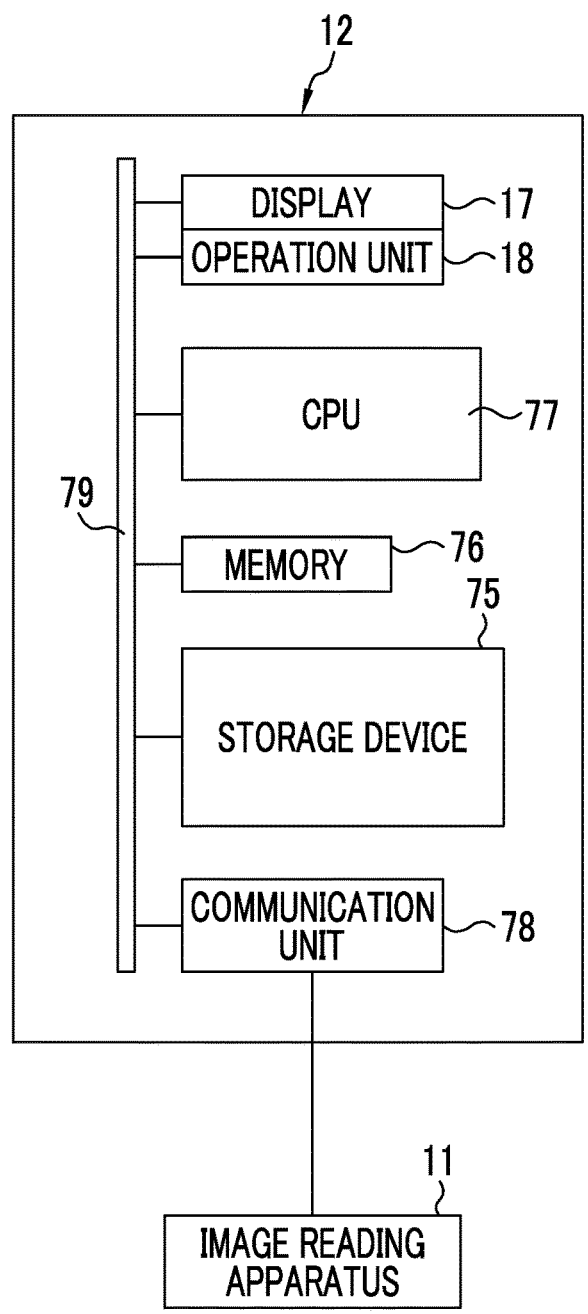
FIG. 10 is a block diagram illustrating a console.

In FIG. 10, the console 12 includes a storage device 75, a memory 76, a central processing unit (CPU) 77, and a communication unit 78, in addition to the display 17 and the operation unit 18. These units are connected to each other through a data bus 79.

The storage device 75 corresponds to a storage unit and is a hard disk drive that is provided in the console 12 or is connected through a cable or a network or a disk array obtained by connecting a plurality of hard disk drives. The storage device 75 stores, for example, a control program, such as an operating system, various application programs, and various kinds of data associated with these programs.

The memory 76 is a work memory that is used to perform a process by the CPU 77. The CPU 77 loads a program stored in the storage device 75 to the memory 76 and performs a process based on the program to control the overall operation of each unit of the console 12. The communication unit 78 is a USB communication interface that performs the communication of various kinds of data with the image reading apparatus 11, similarly to the communication unit 57 of the image reading apparatus 11.

Figure 11:
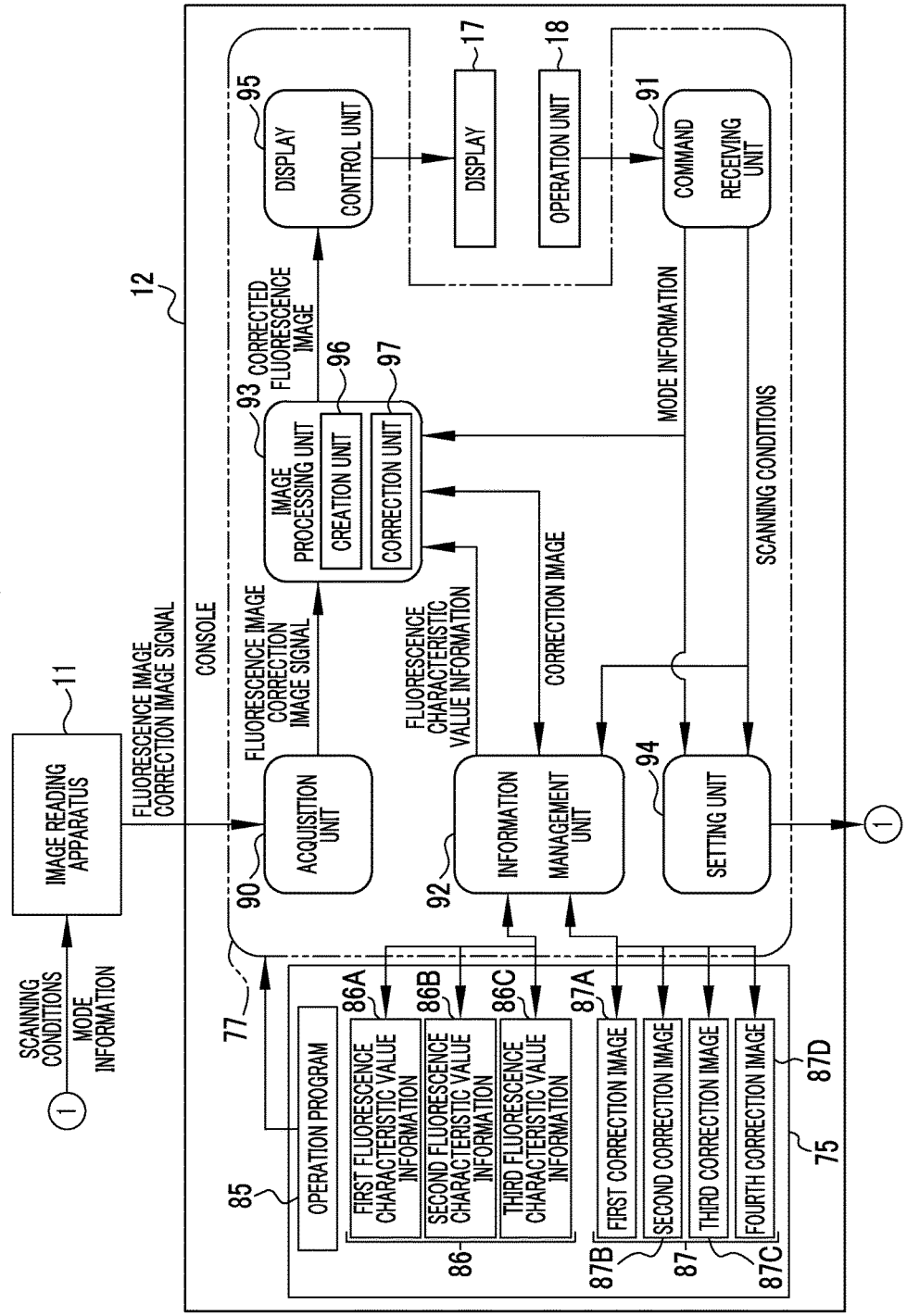
FIG. 11 is a block diagram illustrating a CPU of the console.

In FIG. 11, the storage device 75 stores an operation program 85. The operation program 85 is an application program that causes the console 12 to function as a shading correction apparatus.

The storage device 75 stores fluorescence characteristic value information 86 which is information about a fluorescence characteristic value of the correction plate 65, in addition to the operation program 85. The fluorescence characteristic value information 86 includes first fluorescence characteristic value information 86A of the first correction plate 65A, second fluorescence characteristic value information 86B of the second correction plate 65B, and third fluorescence characteristic value information 86C of the third correction plate 65C (see FIG. 12).

In addition, the storage device 75 stores the correction image 87 created on the basis of the correction image signal FF. The correction image 87 is an image created by correcting a variation in the fluorescence characteristics of the plurality of correction plates 65 appearing in the correction image signal FF, which will be described in detail below. The correction image 87 includes a first correction image 87A for infrared excitation light obtained using the first correction plate 65A, a second correction image 87B for red excitation light obtained using the second correction plate 65B, and a third correction image 87C for a green excitation light and a fourth correction image 87D for blue excitation light obtained using the third correction plate 65C.

In FIG. 12, the fluorescence characteristic value information 86 stores the fluorescence characteristic values FV of each of the plurality of correction plates 65. A number is given to each correction plate 65 and corresponds to the number MN indicating the position of the small region SR in which the corresponding correction plate 65 is provided. That is, the characteristic value FV(11) of number "11" is the characteristic value of the correction plate 65 provided in the small region SR-11. FIG. 12 illustrates the first fluorescence characteristic value information 86A storing the characteristic value FV-A(MN) (M=N=1 to 9) of the first correction plate 65A.

The characteristic value FV is measured in advance by an examination before the correction plate 65 is shipped. For example, the examination is performed in a state in which the correction plate 65 is placed in a dark box in which environmental factors, such as temperature and humidity, are constant. First, prescribed excitation light is emitted from an excitation light source provided in the dark box to the surface (a surface coming into contact with the glass plate 32) of the correction plate 65 and a photomultiplier provided in the dark box detects fluorescent light excited by the excitation light. Then, a signal output from the photomultiplier is stored as the characteristic value FV of the correction plate 65 in the fluorescence characteristic value information 86. In addition, the characteristic value FV stored in the fluorescence characteristic value information 86 may be obtained by scanning the entire surface of the correction plate 65 with excitation light and detecting fluorescent light a plurality of times with the photomultiplier or may be a representative value (for example, the mean or mode) of the characteristic value FV obtained by scanning the entire surface of the correction plate 65 with excitation light and detecting fluorescent light a plurality of times with the photomultiplier. Alternatively, the characteristic value FV may be obtained by emitting excitation light to a point such as the center of the surface.

The plurality of correction plates 65 are created so as to have substantially the same fluorescence characteristics. However, in practice, the fluorescence characteristics of the plurality of correction plates 65 are not exactly the same and there is a difference between the fluorescence characteristics. Therefore, the characteristic values FV of each correction plate 65 are not necessarily equal to each other. For example, the characteristic value FV(11) of the correction plate 65 with number "11" is 1, the characteristic value FV(12) of the correction plate 65 with number "12" is 0.92, and the characteristic value FV(13) of the correction plate 65 with number "13" is 1.05.

In FIG. 11, in a case in which the operation program 85 starts, the CPU 77 functions as an acquisition unit 90, a command receiving unit 91, an information management unit 92, an image processing unit 93, a setting unit 94, and a display control unit 95 in cooperation with the memory 76. A creation unit 96 and a correction unit 97 are constructed in the image processing unit 93.

The acquisition unit 90 has an acquisition function of acquiring a fluorescence image and the correction image signal FF from the image reading apparatus 11. The acquisition unit 90 outputs the fluorescence image and the correction image signal FF to the image processing unit 93.

The command receiving unit 91 receives an operation command input from the operation unit 18. Examples of the operation command include a mode selection command to select one of the normal mode and the maintenance mode and a scanning condition setting command to set the scanning conditions of the fluorescence image.

The scanning conditions include, for example, a set of the excitation light source 26 used and the filter 48, the voltage value of the photomultiplier 31, and the resolution of the fluorescence image. The voltage value of the photomultiplier 31 can be changed to change the density of the fluorescence image. The resolution of the fluorescence image is, specifically, an interval (pixel pitch) at which the fluorescent light FL is read and the scanning speed of the optical head 29 which determine the resolution of the fluorescence image. In the maintenance mode, the resolution is set to the minimum value.

The command receiving unit 91 outputs information (hereinafter, referred to as mode information) of the mode selected by the mode selection command to the image processing unit 93 and the setting unit 94 and outputs the scanning conditions set by the scanning condition setting command to the information management unit 92 and the setting unit 94. Examples of the operation command include a command (hereinafter, referred to as a scanning execution command) to instruct the image reading apparatus 11 to perform scanning, in addition to the above-mentioned commands.

The information management unit 92 manages various kinds of information stored in the storage device 75. In the maintenance mode, the information management unit 92 reads out the fluorescence characteristic value information 86 corresponding to the excitation light source 26 that is used from the storage device 75 and transmits the read fluorescence characteristic value information 86 to the image processing unit 93. For example, in a case in which the excitation light source 26 used is the infrared excitation light source 26A, the information management unit 92 transmits the first fluorescence characteristic value information 86A of the first correction plate 65A for infrared excitation light to the image processing unit 93. In a case in which the excitation light source 26 used is the red excitation light source 26B, the information management unit 92 transmits the second fluorescence characteristic value information 86B of the second correction plate 65B for red excitation light to the image processing unit 93.

In the maintenance mode, the information management unit 92 stores the correction image 87 transmitted from the image processing unit 93 in the storage device 75. In addition, in the normal mode, the information management unit 92 reads out the correction image 87 corresponding to the excitation light source 26 that uses the scanning conditions from the command receiving unit 91 from the storage device 75 and transmits the read correction image 87 to the image processing unit 93. For example, in a case in which the excitation light source 26 used is the infrared excitation light source 26A, the information management unit 92 transmits the first correction image 87A for infrared excitation light to the image processing unit 93. In addition, in a case in which the excitation light source 26 used is the red excitation light source 26B, the information management unit 92 transmits the second correction image 87B for red excitation light to the image processing unit 93.

In a case in which the mode indicated by the mode information from the command receiving unit 91 is the maintenance mode, the image processing unit 93 recognizes the image from the acquisition unit 90 as the correction image signal FF and operates the creation unit 96. In contrast, in a case in which the mode indicated by the mode information from the command receiving unit 91 is the normal mode, the image processing unit 93 recognizes the image from the acquisition unit 90 as a fluorescence image and operates the correction unit 97.

The creation unit 96 creates the correction image 87 from the correction image signal FF transmitted from the acquisition unit 90 on the basis of the fluorescence characteristic value information 86 transmitted from the information management unit 92. First, the creation unit 96 divides the correction image signal FF by the characteristic value FV of the fluorescence characteristic value information 86 to obtain a standardized correction image signal FFS as illustrated in the following Expression (1):

$$FF/FV=FFS \quad (1)$$

The creation unit 96 performs the process represented by Expression (1) for each small region SR. For example, for the image signal FF(11) which is the correction image signal FF of the small region SR-11, the characteristic value FV(11) of the correction plate 65 with number "11" corresponding to the image signal FF(11) is used. Therefore, Expression (1) is rewritten as the following Expression (2), using the number MN (M=N=1 to 9) indicating the position of the small region SR:

$$FF(MN)/FV(MN)=FFS(MN) \quad (2)$$

In the generated standardized correction image signal FFS, a variation in the fluorescence characteristics of the plurality of correction plates 65 has been corrected.

The creation unit 96 calculates the representative value of the standardized correction image signal FFS for each small region SR. Examples of the representative value include the mean and mode of the standardized correction image signals FFS for each small region SR. In this example, since there are 81 small regions SR, 81 representative values of the standardized correction image signals FFS whose number is equal to the number of small regions SR are calculated.

A fluorescence image which is a shading correction target has millions of pixels. Therefore, in a case in which only the representative value of the standardized correction image signal FFS for each small region SR is used, the number of image signals FFF forming the correction image 87 is not sufficient to correct the shading of the entire image detection region 33. For this reason, the creation unit 96 interpolates or extrapolates the deficiency with the representative value of the standardized correction image signals FFS of each small region SR to create the correction image 87. Since a specific method for interpolation and extrapolation has been known, the description thereof will not be repeated. The creation unit 96 outputs the created correction image 87 to the information management unit 92.

The correction unit 97 has a correction function of performing shading correction for the fluorescence image transmitted from the acquisition unit 90 on the basis of the correction image 87 from the information management unit 92. Specifically, in a case in which an image signal of the fluorescence image from the acquisition unit 90 is FR, an image signal of a dark image acquired by performing scanning with the optical head 29, without emitting excitation light, is FD, and an image signal of a shading-corrected fluorescence image (hereinafter, referred to as a corrected fluorescence image) is FC, the correction unit 96 performs calculation represented by the following Expression (3):

$$FC=(FR-FD)/(FFF-FD) \quad (3).$$

In a case in which dark noise or the offset of an image signal is so small as to be negligible, shading correction may be performed using the following Expression (4):

$$FC=FR/FFF \quad (4).$$

The calculation represented by Expression (3) may be performed for each pixel forming the fluorescence image or may be performed for each small region SR. In a case in which the calculation is performed for each small region SR, the representative value (for example, the means or mode) of the image signals FFF of each small region in the correction image 87 and the representative value (for example, the means or mode) of the image signals of each small region SR in the dark image are substituted into Expression (3). This holds for Expression (4).

The image processing unit 93 performs various kinds of image processing, such as a color correction process and a gradation process, for the fluorescence image, in addition to the shading correction. The correction unit 97 performs the shading correction before, for example, the color correction process and the gradation process. The image processing unit 93 outputs the corrected fluorescence image to the display control unit 95.

The setting unit 94 sets the mode information and the scanning conditions from the command receiving unit 91 in the image reading apparatus 11. In the image reading apparatus 11, the mode is switched on the basis of the mode information from the setting unit 94. In addition, the scanning conditions from the setting unit 94 are set in various drivers of the scanning unit 58, such as a driver of the excitation light source 26, drivers of motors for moving the optical head 29, the substrate 47, the concave mirror 45, and the filter unit 30, and a driver of the photomultiplier 31.

In the case of the maintenance mode, the scanning conditions input by the operation unit 18 are not set, but the scanning conditions (however, the resolution is set to the minimum value) for the maintenance mode which have been stored in the storage device 75 in advance are set.

The display control unit 95 controls the display output of the corrected fluorescence image from the image processing unit 93. Specifically, the display control unit 95 generates a screen for displaying the corrected fluorescence image and outputs the screen to the display 17. Examples of the screen include a mode selection screen, a scanning condition setting screen, and a screen for instructing the execution of scanning.

Figure 13:
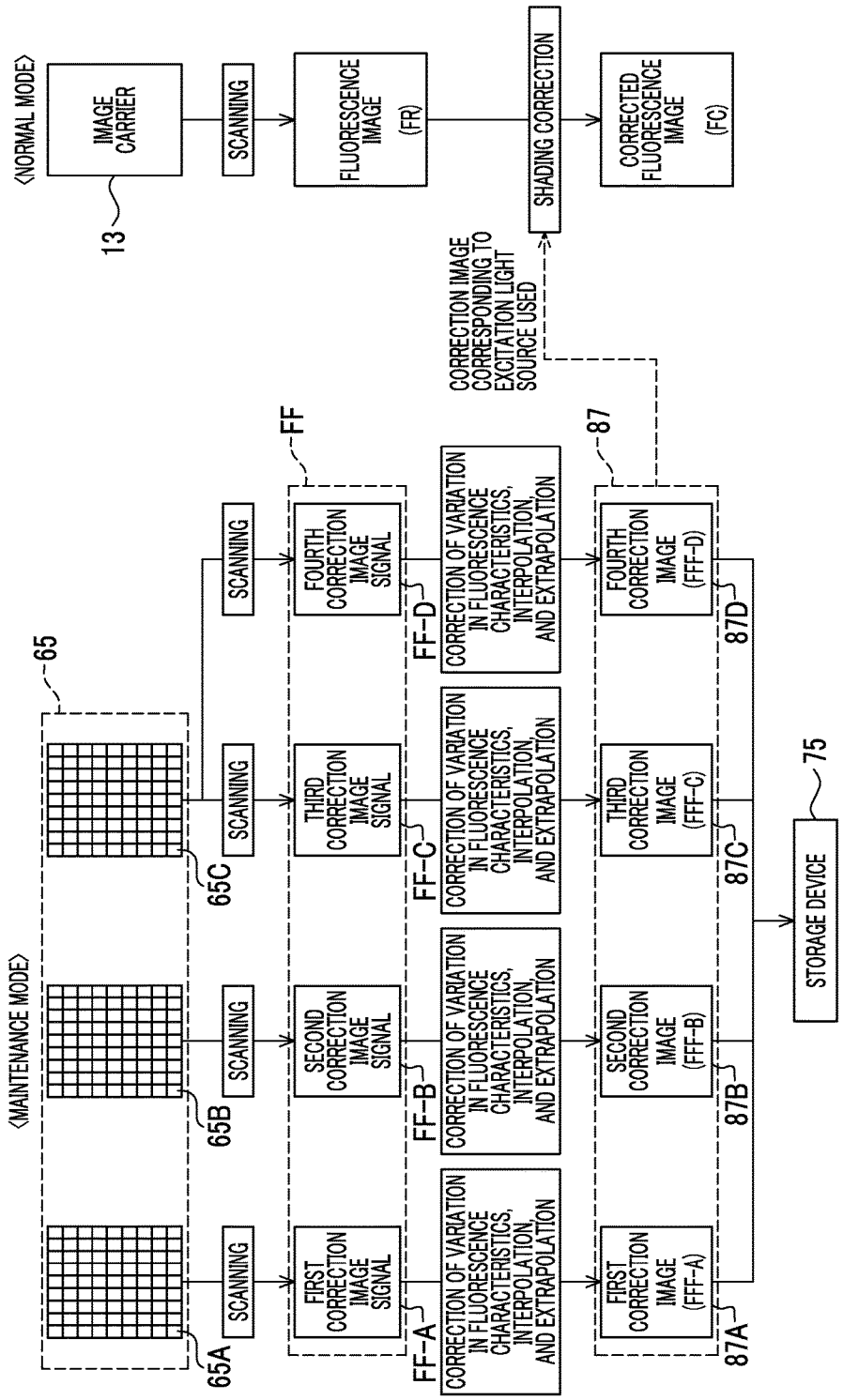
FIG. 13 is a diagram illustrating the schematic procedure of processes in a maintenance mode and a normal mode.

In FIG. 13, as also illustrated in FIG. 7, in the maintenance mode, the first correction plates 65A are scanned with the infrared excitation light source 26A and a first correction image signal FF-A is acquired. In addition, the second correction plates 65B are scanned with the red excitation light source 26B and a second correction image signal FF-B is acquired. The third correction plates 65C are scanned with the green excitation light source 26C and the blue excitation light source 26D and a third correction image signal FF-C and a fourth correction image signal FF-D are acquired. Then, a variation in the fluorescence characteristics of each of the correction image signals FF-A to FF-D is corrected and standardized correction image signals FFS-A to FFS-D are generated. Then, interpolation or extrapolation is performed with the representative values of the standardized correction image signals FFS-A to FFS-D for each small region SR to create correction images 87A to 87D. The correction images 87A to 87D are stored in the storage device 75.

In contrast, in the normal mode, the image carrier 13 is scanned with the excitation light source 26 set in the scanning conditions and a fluorescence image is output. Then, shading correction is performed for the fluorescence image on the basis of the correction image 87 corresponding to the used excitation light source 26 and a corrected fluorescence image is output.

Figure 14:
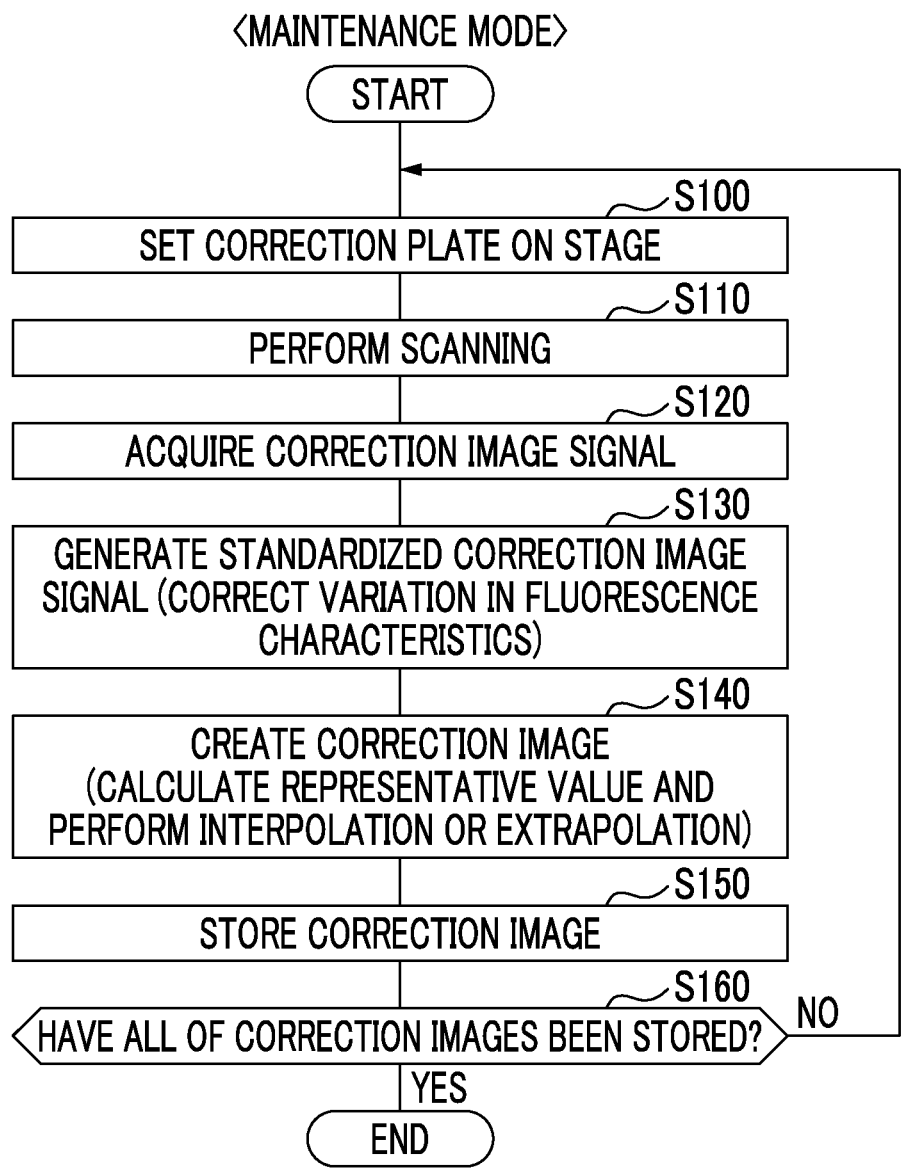
FIG. 14 is a flowchart illustrating the procedure of the process in the maintenance mode.

Next, the operation of the above-mentioned configuration will be described with reference to the flowcharts illustrated in FIGS. 14 and 15. First, in FIG. 14, the user operates the operation unit 18 to select the maintenance mode. First, the first correction plate unit 67A in which the first correction plate 65A is held by the holding frame 66 is set on the stage 25 (Step S100). In this case, the first correction plate unit 67A is set such that the mark 69 of the holding frame 66 is matched with the mark 25C of the stage 25.

After the first correction plate 65A is set, the user inputs a scanning execution command through the screen displayed on the display 17. Then, the image reading apparatus 11 scans the first correction plate 65A using the infrared excitation light source 26A (the infrared filter 48A is used as the filter 48) (Step S110).

The first correction image signal FF-A is output from the image reading apparatus 11 by the scanning of the first correction plate 65A by the infrared excitation light source 26A. The acquisition unit 90 of the console 12 acquires the first correction image signal FF-A (Step S120; an acquisition step). The first correction image signal FF-A is output from the acquisition unit 90 to the creation unit 96 of the image processing unit 93.

The first fluorescence characteristic value information 86A of the first correction plate 65A is transmitted from the information management unit 92 to the creation unit 96. As represented by Expression (2), the creation unit 96 divides the first correction image signal FF-A by the characteristic value FV-A to correct a variation in the fluorescence characteristics of a plurality of first correction plates 65A and generates the first standardized correction image signal FFS-A (Step S130).

Then, the representative value of the first standardized correction image signals FFS-A for each small region SR is calculated and interpolation or extrapolation is performed with the representative value to generate the correction image 87A (Step S140). The correction image 87A is output from the creation unit 96 to the information management unit 92 and is stored in the storage device 75 (Step S150).

Then, the user sets the second correction plate unit 67B in which the second correction plate 65B is held by the holding frame 66 on the stage 25. A series of processes from Step S110 to Step S150 is similarly performed for the second correction plate 65B. Finally, the user sets the third correction plate unit 67C in which the third correction plate 65C is held by the holding frame 66 on the stage 25. A series of processes from Step S110 to Step S150 is similarly performed for the third correction plate 65C.

Specifically, the second correction plate 65B is scanned with the red excitation light source 26B (the red filter 48B is used as the filter 48) and the third correction plate 65C is scanned with the green excitation light source 26C and the blue excitation light source 26D (the green filter 48C and the blue filter 48D are used as the filter 48). Then, the acquisition unit 90 acquires the second correction image signal FF-B, the third correction image signal FF-C, and the fourth correction image signal FF-D. The second correction image 87B, the third correction image 87C, and the fourth correction image 87D are generated by the creation unit 96 on the basis of the acquired correction image signals and are then stored in the storage device 75. In a case in which all of the correction images 87A to 87D are stored in the storage device 75 (YES in Step S160), the maintenance mode ends.

The correction plate 65 has a plane size corresponding to a plurality of small regions SR in the image detection region 33. Therefore, the correction plate 65 is less likely to warp than a correction plate (having the same thickness and hardness as the correction plate 65) having a plane size that is substantially equal to that of the image detection region 33 and the warpage is less likely to change depending on a usage environment. In addition, fluorescence characteristics in the plane are less likely to be non-uniform. Shading correction is performed on the basis of the correction image 87 created from the correction image signal FF obtained by irradiating the correction plate 65 with excitation light. Therefore, it is possible to accurately perform shading correction.

As a method for preventing the warpage of the correction plate 65, a method is considered which increases the thickness of the correction plate 65. However, the correction plate 65 needs to have a thickness that can be set on the stage 25, which limits the thickness of the correction plate 65. Alternatively, a method is considered in which the correction plate 65 is made of a material with a relatively high rigidity. The correction plate 65 needs to include a fluorescent material having the wavelength characteristics in which an excitation wavelength band and an emission wavelength band at least partially overlap the excitation wavelength band and the emission wavelength band of the fluorescent material included in the image carrier 13, which limits the material to be used. Therefore, the method according to the invention in which the correction plate 65 has a plane size corresponding to a plurality of small regions SR in the image detection region 33 is the best method for preventing the warpage of the correction plate 65.

For example, it is preferable that the correction plate 65 has a plane size corresponding to a plurality of small regions SR in the image detection region 33 and is made of a material which is as thick as possible and is as rigid as possible in order to prevent the warpage of the correction plate 65.

The correction image signal FF is obtained by irradiating each correction plate 65 provided in the corresponding small region SR with excitation light. Therefore, the correction image signal FF can be acquired by one scan operation and it is possible to reduce the time and effort required for the maintenance mode. In addition, since the resolution is set to the minimum value in the maintenance mode, the scanning time can be shorter than that in a case in which the fluorescence image is acquired.

The representative value of the standardized correction image signals FFS for each small region SR is calculated and interpolation or extrapolation is performed with the representative value to create the correction image 87. Therefore, it is possible to reduce the number of sampling processes for the correction image signal FF and to reduce the scanning time in the maintenance mode. Ultimately, each correction image signal FF may be acquired for each small region SR and may be used as the representative value. In addition, it is not necessary to consider a boundary line between adjacent correction plates 65 and it is possible to create the correction image 87 using only interpolation or extrapolation, without performing, for example, a process of making the boundary line invisible.

The correction plate 65 has the same plane size as the small region SR and is laid in the image detection region 33. Therefore, it is possible to simply acquire the correction image signal FF in which the entire image detection region 33 is covered with a plurality of correction plates 65. In addition, it is preferable to simply create the same correction plates 65. In this case, it is possible to substantially match various specifications, such as a plane size, a thickness, hardness, and fluorescence characteristics, of the plurality of correction plates 65 with a simple structure.

The plurality of correction plates 65 and the holding frame 66 form one correction plate unit 67. Therefore, it is possible to lay a plurality of correction plates 65 in the image detection region 33 only by setting the correction plate unit 67 on the stage 25. As a result, it is possible to reduce the time and effort required for the user to perform operations.

The mark 69 is provided in the holding frame 66 and the holding frame 66 is set on the stage 25 such that the mark 69 is matched with the mark 25C. Therefore, the user can set the holding frame 66 and the correction plate 65 with a correct attachment posture, without hesitation. In addition, since the holding frame 66 is set, the same correction plate 65 is set in the same small region SR. Therefore, it is possible to maintain the same conditions.

Since the creation unit 96 corrects a variation in the fluorescence characteristics of a plurality of correction plates 65, it is possible to generate the standardized correction image signal FFS from which the influence of a variation in density caused by the variation in the fluorescence characteristics of the plurality of correction plates 65 has been excluded from the correction image signal FF. In a case in which the degree of variation in the fluorescence characteristics of the plurality of correction plates 65 represented by the characteristic value FV is within an allowable range, the standardized correction image signal FFS may not be generated, the correction image signal FF may be maintained, the representative value of the correction image signal FF for each small region SR may be calculated, and interpolation or extrapolation may be performed with the calculated representative value to create the correction image 87.

Figure 15:
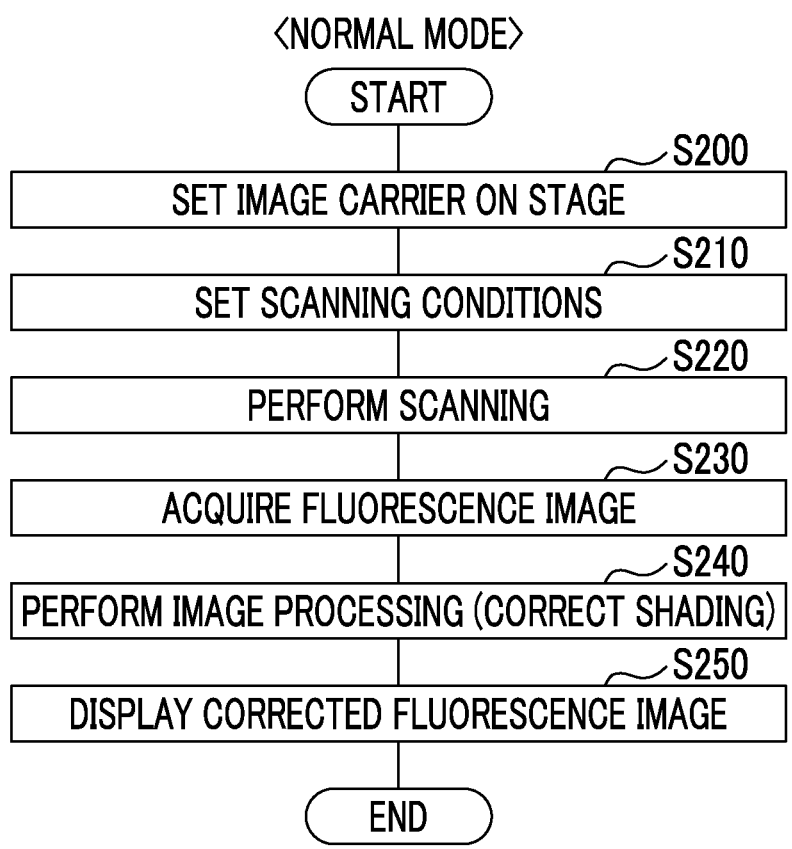
FIG. 15 is a flowchart illustrating the procedure of the process in the normal mode.

In a case in which the image carrier 13 is scanned, the user operates the operation unit 18 to select the normal mode, as illustrated in FIG. 15. In the normal mode, the holding frame 66 is removed and the image carrier 13 is set on the stage 25 (Step S200). After the image carrier 13 is set, the user inputs a scanning condition setting command and a scanning execution command through the screen displayed on the display 17. Then, scanning conditions are set in the image reading apparatus 11 (Step S210) and scanning is performed on the basis of the scanning conditions (Step S220).

A fluorescence image is output from the image reading apparatus 11 by the scanning of the image carrier 13. The fluorescence image is acquired by the acquisition unit 90 of the console 12 (Step S230). The fluorescence image is output from the acquisition unit 90 to the image processing unit 93.

The correction image 87 corresponding to the excitation light source 26 used for the scanning is transmitted from the information management unit 92 to the correction unit 97 of the image processing unit 93. The correction unit 97 performs shading correction for the fluorescence image from the acquisition unit 90 on the basis of the correction image 87 from the information management unit 92, as represented by Expression (3) or Expression (4) (Step S240; a correction step).

Various kinds of image processing are performed for the corrected fluorescence image which is a shading-corrected fluorescence image and the corrected fluorescence image is output to the display control unit 95. The corrected fluorescence image is displayed on the display 17 by the display control unit 95 (Step S250). In this way, one scanning operation ends.

The console 12 performs shading correction, using the correction image 87 created from the correction image signal FF of each small region SR. Therefore, it is possible to accurately perform shading correction for each small region SR and shading correction for the entire image detection region 33. In addition, the correction image 87 is created by correcting a variation in the fluorescence characteristics of a plurality of correction plates 65 in the correction image signal FF. Therefore, shading correction can be accurately performed, without being affected by the variation in the fluorescence characteristics of the plurality of correction plates 65.

The use of Expression (3) for shading correction means that shading correction is performed after the image signal FD of a dark image is subtracted from the image signal FR of the fluorescence image and the image signal FFF of the correction image 87 to remove dark noise or image signal offset from the fluorescence image and the correction image 87. As such, in a case in which shading correction is performed after dark noise or image signal offset is removed, it is possible to guarantee the accuracy of correction.

Before shading correction is performed, the correction image 87 is generated and stored in the storage device 75. In a case in which shading correction is performed, the correction unit 97 reads out the correction image 87 from the storage device 75. Therefore, it is possible to reduce the time and effort required to generate the correction image 87 whenever shading correction is performed. Once the correction image 87 is generated and stored, it is possible to perform shading correction only by reading the correction image 87, without the time required for shading correction. Instead of the correction image 87, the representative value of the correction image signal FF or the standardized correction image signal FFS for each small region SR may be stored in the storage device 75 and the correction image 87 may be generated from the representative value whenever shading correction is performed.

In this example, the image detection region 33 is equally divided into 81 (=9×9) small regions SR. However, the number of small regions SR may be greater than or less than 81. However, it is preferable that the number of small regions SR is equal to or greater than 9. In a case in which the number of small regions SR is equal to or greater than 9, it is possible to check at least the tendency of a change in the density of the entire image detection region 33 with the representative value of the correction image signal FF for each small region SR.

As in this example in which the number of small regions SR is 81, the division numbers of small regions SR in the main scanning direction X and the sub-scanning direction Y may be equal to each other. That is, the number of small regions SR may be a square number. For example, the number of small regions SR may be 10×8=80. That is, the division number in the main scanning direction X may be 10 and the division number in the sub-scanning direction Y may be 8.

In this example, the image detection region 33 is equally divided into the rectangular small regions SR by lines along the main scanning direction X and the sub-scanning direction Y. However, for example, the image detection region 33 may be equally divided into four triangular regions by diagonal lines and the four triangular regions may be used as the small regions SR.

The image detection region 33 may not be equally divided into the small regions SR. That is, the small regions SR may not have the same plane size. However, in a case in which the image detection region 33 is equally divided into the small regions SR, it is possible to reduce the time and effort required to manufacture the correction plates 65 and it is not necessary to perform an unnecessary process, such as a process of changing a method for calculating the representative value of the standardized correction image signal FFS for each small region SR, in order to create the correction image 87.

Second Embodiment

In the first embodiment, the correction plates 65 whose number is equal to the number of small regions SR are prepared and excitation light is emitted to the correction plates 65 disposed in each small region SR to obtain the correction image signal FF. However, the invention is not limited thereto. As in a second embodiment illustrated in FIGS. 16 to 18, the correction plates whose number is less than the number of small regions SR may be moved from an initial position one or more times and excitation light may be emitted to the correction plates at the initial position and the moved position to obtain the correction image signal FF.

Figure 16:
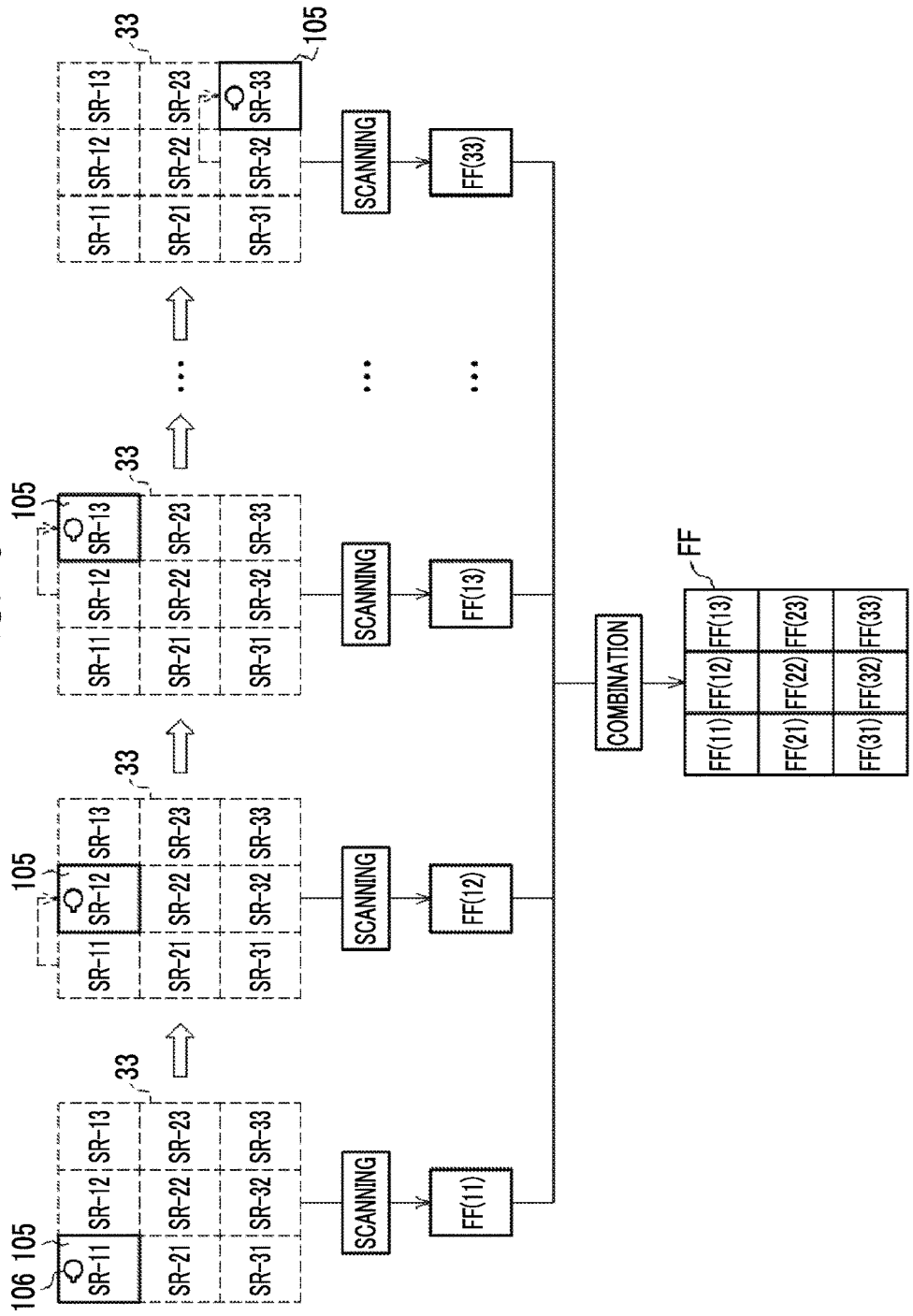
FIG. 16 is a diagram illustrating an aspect in which one correction plate is moved to obtain a correction image signal.

FIG. 16 illustrates a case in which the image detection region 33 is equally divided into 9 (=3×3) small regions SR and one correction plate 105 is moved from a small region SR-11 at an initial position to the remaining eight small regions SR-12, SR-13, . . . , SR-33 eight times. In this case, a total of nine scanning operations are performed at the initial position and the moved positions to acquire correction image signals FF(MN) (M=N=1 to 3) for each region which correspond to the small regions SR-MN (M=N=1 to 3). The correction image signals FF(MN) for each region are combined into a correction image signal FF.

In addition, the scanning may be performed for the entire image detection region 33. The image signal of a region other than the small regions SR in which the correction plates 105 are present is meaningless data. Therefore, it is preferable to selectively perform scanning for only the small regions SR in which the correction plates 105 are present. In this case, the order in which the correction plate 105 is moved is set as a scanning condition in advance. Since the region to be scanned is limited to the small region SR, it is possible to reduce the scanning time.

A fitting protrusion 106 is provided at the center of an upper portion of the rear surface of the correction plate 105. The fitting protrusion 106 has a key shape in which a convex portion is formed in a part of a cylinder. The fitting protrusion 106 enables the user to recognize the up, down, left, and right sides of the correction plate 105 and the front and rear sides of the correction plate 105. That is, the fitting protrusion 106 is an index indicating the up, down, left, and right sides of the correction plate 105 and the front and rear sides of the correction plate 105.

Figure 17:
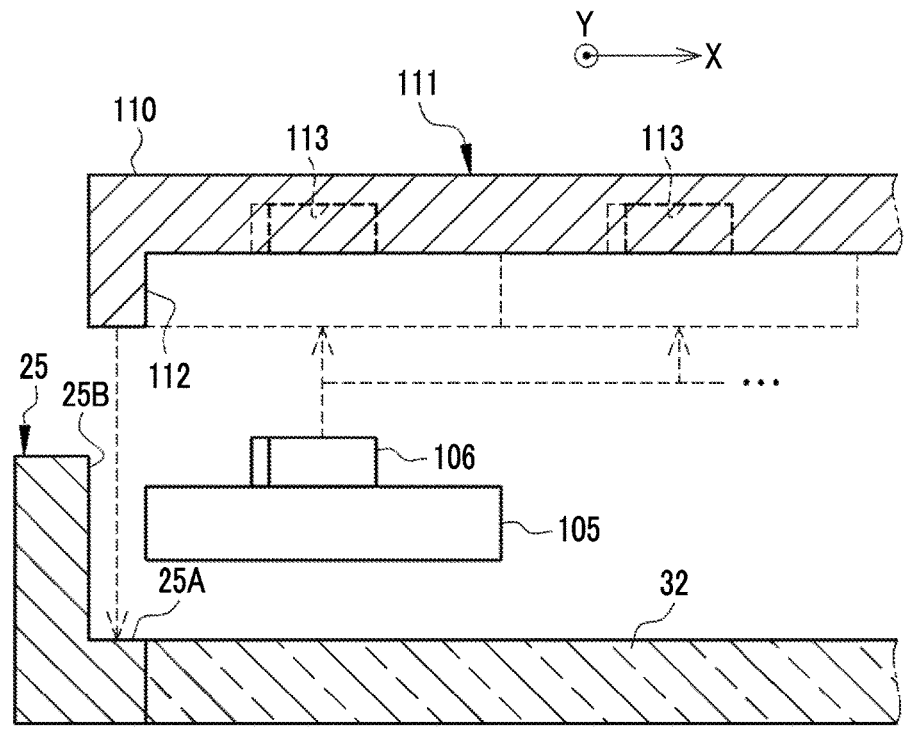
FIG. 17 is a cross-sectional view illustrating a holding frame for a correction plate.

As illustrated in FIG. 17, in the second embodiment, a correction plate unit 111 including the correction plates 105 and a holding frame 110 is used. A concave portion 112 for accommodating the correction plates 105 are formed in the holding frame 110, as in the holding frame 66 according to the first embodiment. Fitting holes 113 fitted to the fitting protrusions 106 of the correction plates 105 are provided for each small region SR in the concave portion 112. The fitting hole 113 has the same key shape as the fitting protrusion 106. Therefore, the correction plates 105 are held in each small region SR in the same direction in the holding frame 110.

The fitting protrusion 106 and the fitting hole 113 are fitted to the extent that the correction plate 105 is not taken out of the holding frame 110. In a case in which the user moves the correction plate 105, the user applies sufficient force to release the fitting between the fitting protrusion 106 and the fitting hole 113 to the correction plate 105 to take the correction plate 105 out of the holding frame 110.

As such, the correction plates whose number is less than the number of small regions SR are moved from the initial position one or more times and excitation light is emitted to the correction plates at the initial position and the moved positions to obtain the correction image signal FF. Therefore, it is possible to reduce the number of correction plates and reduce the cost of components.

In a case in which one correction plate 105 is used as illustrated in FIG. 16, it is not necessary to correct a variation in the fluorescence characteristics unlike the case in which a plurality of correction plates are used. Therefore, the creation unit 96 does not need to perform a process of using the correction image signal FF as the standardized correction image signal FFS. Of course, the standardized correction image signal FFS is not generated and shading correction is performed using the correction image signal FF. That is, the correction unit 97 does not perform interpolation or extrapolation with the representative value of the standardized correction image signal FFS to calculate the image signal FFF represented by Expression (3) or Expression (4), but performs interpolation or extrapolation with the representative value of the correction image signal FF to calculate the image signal FFF.

Figure 18:
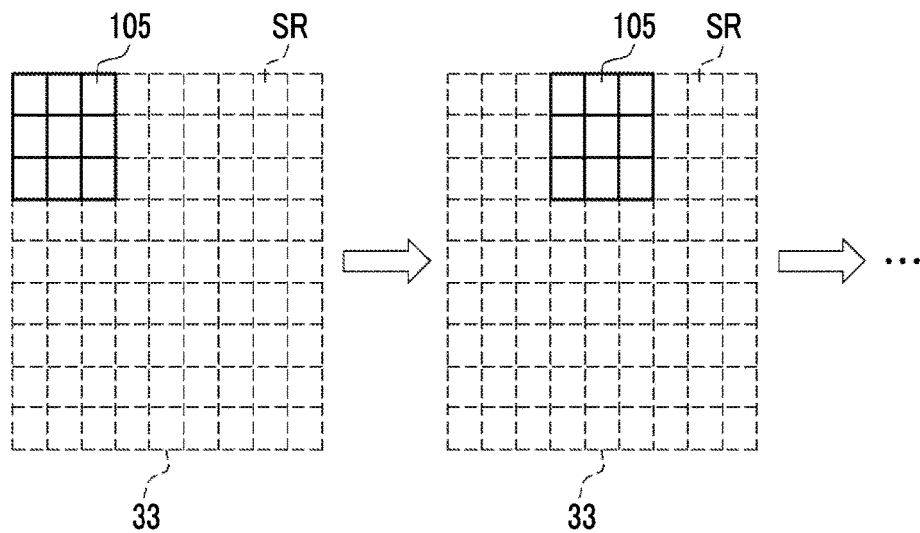
FIG. 18 is a diagram illustrating an aspect in which a plurality of correction plates are moved to obtain a correction image signal.

In addition, the number of correction plates is preferably less than the number of small regions SR and is not limited to 1 as illustrated in FIG. 16. For example, as illustrated in FIG. 18, nine correction plates 105 may be prepared for 81 small regions SR. The nine correction plates 105 may be moved eight times and the correction image signal FF(MN) for each region which corresponds to the nine small regions SR may be obtained by one scanning operation. In this case, as in the first embodiment, the same correction plate 105 is set in the same small region SR. In addition, the creation unit 96 corrects a variation in the fluorescence characteristics of each correction plate 105.

For example, the following may be used as the index indicating the up, down, left, and right sides of the correction plate and the front and rear sides of the correction plate, instead of or in addition to the fitting protrusion 106: one of four corners of the correction plate is cut out and the cut corner is used as the index; or a number corresponding to the number MN indicating the position of the small region SR is printed at one of four corners of the correction plate and is used as the index.

Third Embodiment

Figure 19:
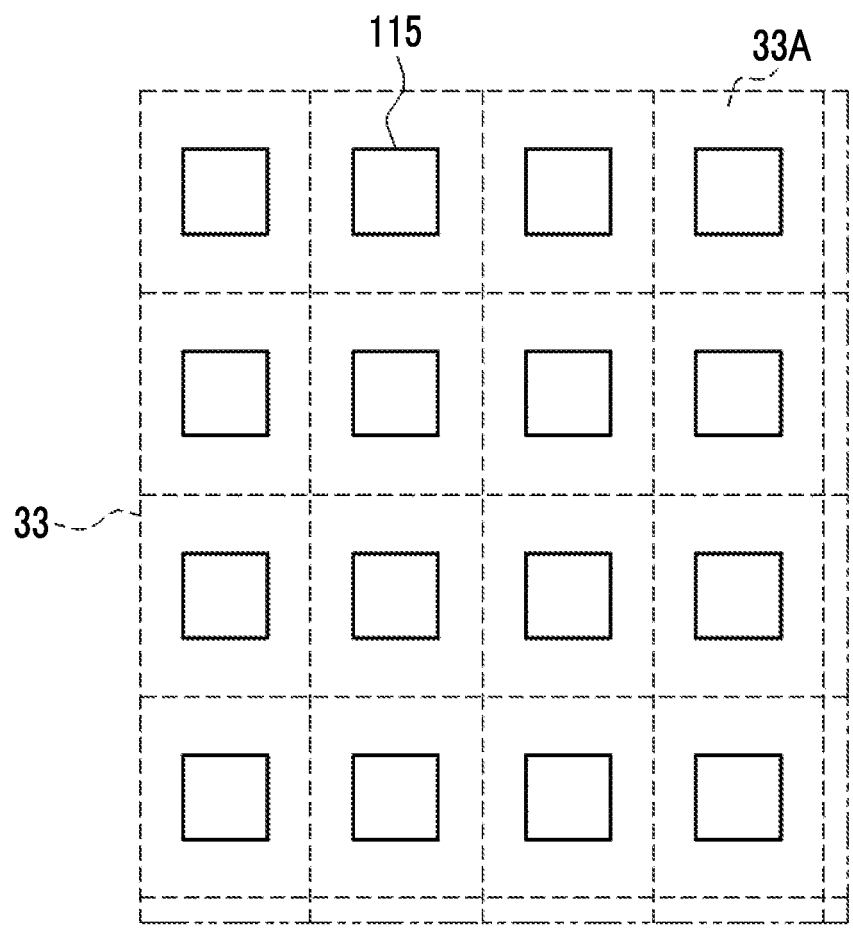
FIG. 19 is a diagram illustrating a correction plate having a smaller plane size than a small region.

In each of the above-described embodiments, the correction plate has the same plane size as the small region SR. However, as in a third embodiment illustrated in FIG. 19, a correction plate 115 having a smaller plane size than the small region SR may be used. In FIG. 19, the correction plate 115 has a plane size that is about a quarter of the plane size of the small region SR and has a square shape. The plane size corresponding to the small region SR is not limited to the plane size that is equal to that of the small region SR and includes a plane size accommodated in the small region SR. In addition, the small region SR and the correction plate do not need to have the same shape. That is, as in this embodiment, the small region SR has a rectangular shape and the correction plate 105 has a square shape.

The correction plates 115 whose number is equal to the number of small regions SR are prepared, similarly to the correction plates 65 according to the first embodiment. The correction plates 115 are arranged such that the centers of the correction plates 115 are aligned with the centers of the small regions SR.

As such, the correction plate 115 having a smaller plane size than the small region SR is less likely to warp than the correction plate having the same plane size as the small region SR and the warpage state of the correction plate 115 is less likely to change depending on a usage environment. In addition, fluorescence characteristics in the plane are less likely to be non-uniform. Therefore, it is possible to further improve the accuracy of shading correction.

Furthermore, the correction plate 115 having a smaller plane size than the small region SR may be used to generate a correction image 127 on the basis of the correction image signal FF obtained by moving the correction plate 115 from an initial position one or more times and emitting excitation light to the correction plate 115 at the initial position and the moved positions as in the second embodiment.

Figure 20:
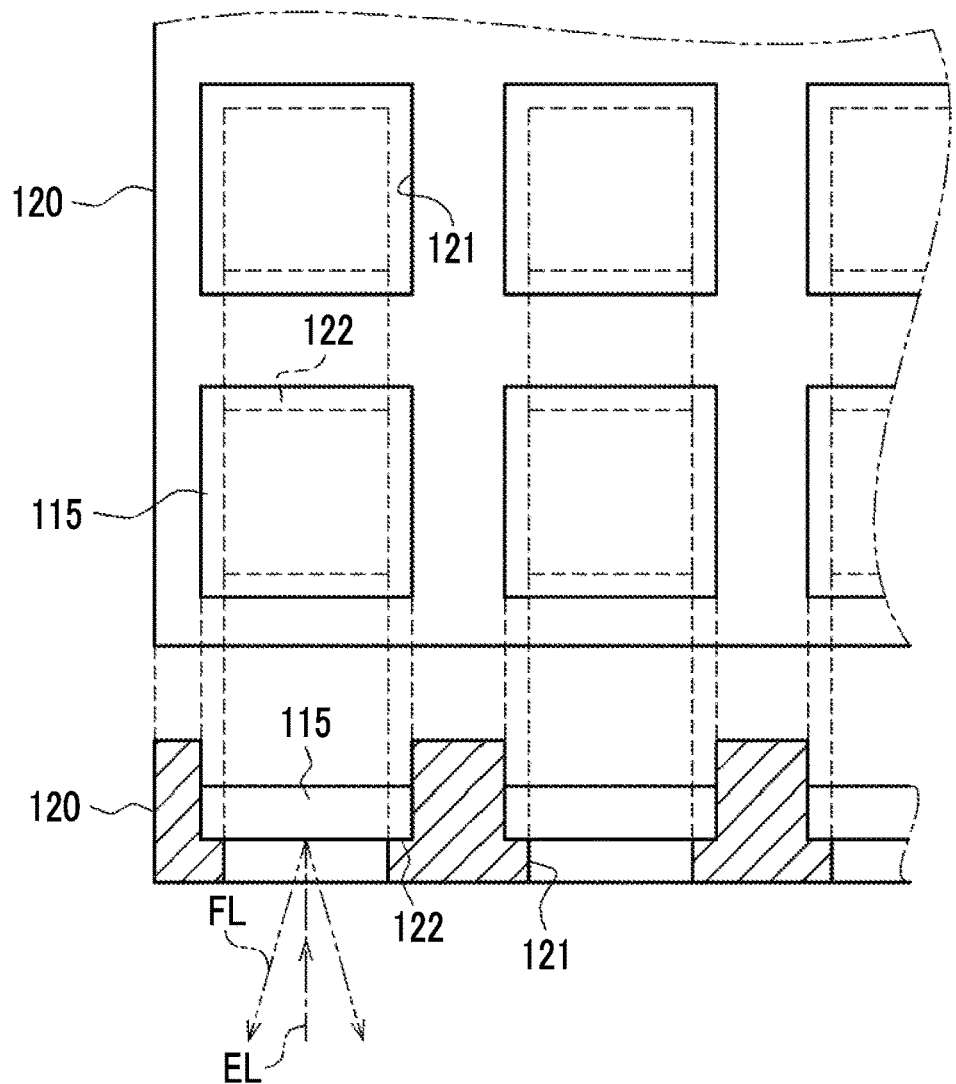
FIG. 20 is a diagram illustrating another example of the holding frame.

A holding frame 120 illustrated in FIG. 20 may be used as the holding frame for the correction plate 115 having a smaller plane size than the small region SR. In FIG. 20, the upper side shows a plan view and the lower side shows a cross-sectional view. The holding frame 120 has accommodation holes 121 in which the correction plates 115 are accommodated for each small region SR. The accommodation hole 121 passes through the holding frame 120 in the vertical direction and a step portion 122 on which the edge of the correction plate 115 is placed and fixed is formed in a middle portion of the accommodation hole 121.

The holding frame 120 is provided in the image reading apparatus 11, instead of the stage 25. Therefore, excitation light EL is directly emitted to the correction plate 115, without being transmitted through the glass plate 32. In addition, fluorescent light FL is directly incident on the optical head 29, without being transmitted through the glass plate 32.

In the aspect described in, for example, the first embodiment in which the holding frame is provided on the stage 25, there is a concern that the glass plate 32 will warp due to the weight of the holding frame and a variation in density caused by the warpage of the glass plate 32 will be included as noise in the correction image signal FF. In contrast, in a case in which the holding frame 120 illustrated in FIG. 20 is provided instead of the stage 25, since the glass plate 32 is not provided, it is possible to completely remove the concern that a variation in density caused by the warpage of the glass plate 32 will be included as noise in the correction image signal FF.

In each of the above-described embodiments, the image reading apparatus 11 in which the optical axis of the excitation light EL and the optical axis of the fluorescent light FL in the optical head 29 are aligned with each other is given as an example. However, the invention is not limited thereto. An optical head 130 that is schematically illustrated in FIG. 21 may be used.

Figure 21:
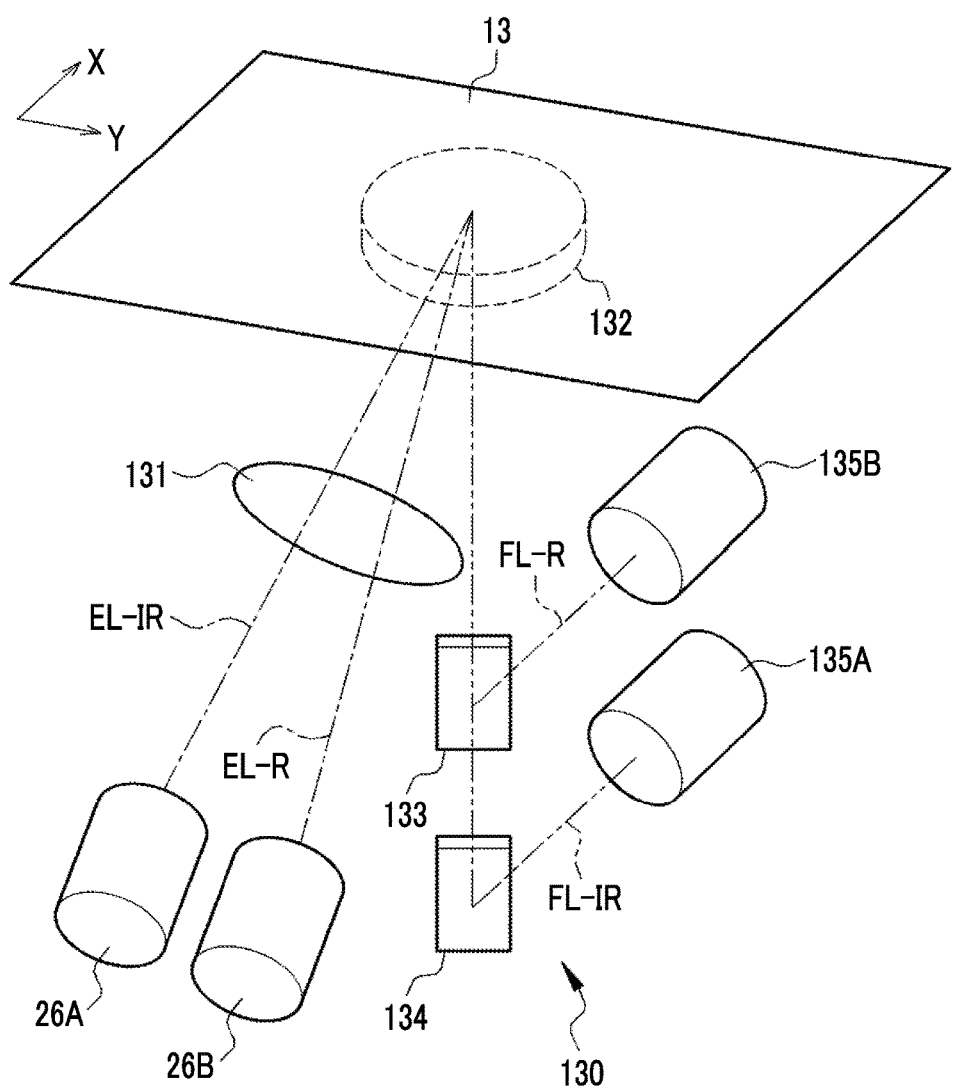
FIG. 21 is a diagram illustrating another example of an optical head.

In FIG. 21, the optical head 130 includes the infrared excitation light source 26A, the red excitation light source 26B, an objective lens 131, a condensing lens 132, a dichroic mirror 133, a mirror 134, a first avalanche photodiode (hereinafter, referred to as an APD) 135A, and a second APD 135B. These components are integrated into a module. The optical head 130 is moved in the main scanning direction X and the sub-scanning direction Y, similarly to the optical head 29 according to the first embodiment. In this case, the image detection region is a region which is irradiated with excitation light by the module and in which fluorescent light is detected.

The objective lens 131 focuses infrared excitation light EL-IR from the infrared excitation light source 26A and red excitation light EL-R from the red excitation light source 26B on the image carrier 13 which is set on a stage (not illustrated). The condensing lens 132 condenses the infrared fluorescent light FL-IR and the red fluorescent light FL-R from the image carrier 13 and guides the light to the dichroic mirror 133 that is provided below the condensing lens 132.

The dichroic mirror 133 transmits the infrared fluorescent light FL-IR from the condensing lens 132 and reflects the red fluorescent light FL-R to the second APD 135B. The mirror 134 reflects the infrared fluorescent light FL-IR transmitted through the dichroic mirror 133 to the first APD 135A.

The first APD 135A and the second APD 135B correspond to a detection unit, photoelectrically detect the infrared fluorescent light FL-IR and the red fluorescent light FL-R at a predetermined time, and output an analog image signal corresponding to the detected fluorescent light, instead of the photomultiplier 31 according to the first embodiment.

As such, the invention can also be applied to a case in which the optical head 130 in which the optical axes of the excitation light EL and the fluorescent light FL are different from each other is used. In addition, a detection unit for the fluorescent light FL is not limited to the photomultiplier 31 according to the first embodiment and may be the APD 135 as in the optical head 130. Furthermore, an optical head may be used in which a plurality of excitation light sources 26 and a plurality of detection units for the fluorescent light FL which correspond to the plurality of excitation light sources 26 are optically arranged along the same axis.

A charge coupled device (CCD) area sensor may be used as the detection unit for the fluorescent light FL. In this case, similarly to the first embodiment, shading correction is performed using Expression (3) or Expression (4).

In each of the above-described embodiments, the example in which the acquisition unit 90, the creation unit 96, and the correction unit 97 are constructed in the CPU 77 of the console 12 and the console 12 is used as the shading correction apparatus has been described. However, the image reading apparatus 11 may have the functions of the shading correction apparatus. In this case, the acquisition unit 90, the creation unit 96, and the correction unit 97 are provided in, for example, the controller 59. In addition, a computer different from the image reading apparatus 11 and the console 12 may have the functions of the shading correction apparatus.

In each of the above-described embodiments, the hardware structure of the processors (processing units) for performing various processes, such as the acquisition unit 90, the creation unit 96, and the correction unit 97, is, for example, the CPU 77 which is a general-purpose processor that executes software (operation program 85) to function as various processing units.

Instead of some or all of the functions implemented by the CPU 77, the following various processors may be used. Various processors include, for example, a programmable logic device (PLD) which is a processor of which the circuit configuration can be changed after manufacture, such as a field programmable gate array (FPGA), and a dedicated electric circuit which is a processor having a circuit configuration that is designed exclusively for a specific process, such as an application specific integrated circuit (ASIC). The hardware structure of the various processors is, specifically, is an electric circuit (circuitry) into which a circuit element, such as a semiconductor element, is incorporated.

It is possible to check the invention indicated by the following supplementary node from the above description.

Supplementary Note 1

Provided is a shading correction apparatus that is used for an image reading apparatus including an excitation light source that irradiates an image carrier, which carries image information and includes a fluorescent material, with excitation light in an image detection region, and a detection unit that detects a fluorescence image on the basis of fluorescent light emitted from the fluorescent material excited by the excitation light, and corrects shading which is density unevenness in the fluorescence image detected by the detection unit. The shading correction apparatus comprises: an acquisition processor that acquires a correction image signal detected by the detection unit in a state in which a flat-plate-shaped correction plate, which has a wavelength characteristic in which an excitation wavelength band and an emission wavelength band at least partially overlap an excitation wavelength band and an emission wavelength band of the fluorescent material, respectively, and has a plane size corresponding to a plurality of small regions in the image detection region, is disposed in the corresponding small region in the image detection region; a creation processor that creates a correction image on the basis of the correction image signal of each small region in the image detection region; and a correction processor that performs shading correction for the fluorescence image on the basis of the correction image.

In the invention, the above-described various embodiments or various modification examples may be appropriately combined with each other. In addition, the invention is not limited to the above-described embodiments and may have various configurations without departing from the scope and spirit of the invention. Furthermore, the invention can be applied to a program and a storage medium storing the program.

EXPLANATION OF REFERENCES

10: image detection system
11: image reading apparatus
12: console (shading correction apparatus)
13: image carrier
14: housing
15, 16: cover
17: display
18: operation unit
25: stage
25A: bottom
25B: side surface
25C: mark
26: excitation light source 26A: excitation light source (infrared excitation light source)
26B: excitation light source (red excitation light source)
26C: excitation light source (green excitation light source)
26D: excitation light source (blue excitation light source)
27: light source optical system
28: light guide optical system
29, 130: optical head
30: filter unit
31: photomultiplier (detection unit)
32: glass plate
33: image detection region
34 to 37: collimator lens
38, 42, 43, 134: mirror
39 to 41, 133: dichroic mirror
44: perforated concave mirror
45, 50: concave mirror
46: through hole
47: substrate
48: filter
48A: filter (infrared filter)
48B: filter (red filter)
48C: filter (green filter)
48D: filter (blue filter)
48E: filter
51: aspheric lens
55: A/D converter (A/D)
56: image memory
57: communication unit
58: scanning unit
59: controller
65, 105, 115: correction plate
65A to 65C: first to third correction plates
66, 110, 120: holding frame
67, 67A to 67C, 111: correction plate unit
68, 112: concave portion
69: mark
75: storage device
76: memory
77: CPU
78: communication unit
79: data bus
85: operation program
86: fluorescence characteristic value information
86A to 86C: first to third fluorescence characteristic value information items
87: correction image
87A to 87D: first to fourth correction images
90: acquisition unit
91: command receiving unit
92: information management unit
93: image processing unit
94: setting unit
95: display control unit
96: creation unit
97: correction unit
106: fitting protrusion
113: fitting hole
121: accommodation hole
122: step portion
131: objective lens
132: condensing lens
135A, 135B: first and second avalanche photodiodes (APD)
FF: correction image signal
FFS: standardized correction image signal
FFF: image signal of correction image
FR: image signal of fluorescence image
FC: image signal of corrected fluorescence image
FV: characteristic value
SR: small region
X: main scanning direction
Y: sub-scanning direction
EL: excitation light
EL-IR: infrared excitation light
EL-R: red excitation light
FL: fluorescent light
FL-IR: infrared fluorescent light
FL-R: red fluorescent light
S100 to S150, S200 to S250: step

What is claimed is:

1. A shading correction apparatus that is used for an image reading apparatus including an excitation light source that irradiates an image carrier, which carries image information and includes a fluorescent material, with excitation light in an image detection region, and a detection unit that detects a fluorescence image on the basis of fluorescent light emitted from the fluorescent material excited by the excitation light, and corrects shading which is density unevenness in the fluorescence image detected by the detection unit, the shading correction apparatus comprising:
a flat-plate-shaped correction plate that has a wavelength characteristic in which an excitation wavelength band and an emission wavelength band at least partially overlap an excitation wavelength band and an emission wavelength band of the fluorescent material, respectively, and has a plane size corresponding to a plurality of small regions in the image detection region;
an acquisition unit that acquires a correction image signal detected by the detection unit in a state in which the correction plate is disposed in the corresponding small region in the image detection region;
a creation unit that creates a correction image on the basis of the correction image signal of each small region in the image detection region; and
a correction unit that performs shading correction for the fluorescence image on the basis of the correction image.

2. The shading correction apparatus according to claim 1, wherein the image detection region is equally divided into the small regions.

3. The shading correction apparatus according to claim 1, wherein the correction image is created from the correction image signal of each small region obtained by irradiating the correction plate disposed in each small region with the excitation light.

4. The shading correction apparatus according to claim 1, wherein the correction image is created from the correction image signal of each small region obtained by moving the correction plates whose number is less than the number of small regions from an initial position one or more times and irradiating the correction plates with the excitation light at the initial position and the moved positions.

5. The shading correction apparatus according to claim 1, wherein, in a case in which there are a plurality of the correction plates, fluorescence characteristic values of the plurality of correction plates are stored in a storage unit in advance, and
the creation unit divides the correction image signal of each small region by the characteristic value of the corresponding correction plate to correct a variation in the fluorescence characteristics of the plurality of correction plates and creates the correction image.

6. The shading correction apparatus according to claim 1, wherein the creation unit performs interpolation or extrapolation with the correction image signal of each small region to create the correction image.

7. The shading correction apparatus according to claim 1, wherein the creation unit creates the correction image and stores the correction image in the storage unit before the shading correction is performed, and in a case in which the shading correction is performed, the correction unit reads out the correction image from the storage unit.

8. The shading correction apparatus according to claim 1, wherein the correction plate has the same plane size as the small region and is laid in the image detection region.

9. The shading correction apparatus according to claim 1, wherein the correction plate has a smaller plane size than the small region.

10. The shading correction apparatus according to claim 1, further comprising:

a holding frame that holds the correction plate and is provided in the image detection region.

11. The shading correction apparatus according to claim 1, wherein the correction plate has an index indicating the up, down, left, and right sides of the correction plate and the front and rear sides of the correction plate.

12. The shading correction apparatus according to claim 1, wherein the number of small regions is equal to or greater than 9.

13. A method for operating a shading correction apparatus that is used for an image reading apparatus including an excitation light source that irradiates an image carrier, which carries image information and includes a fluorescent material, with excitation light in an image detection region, and a detection unit that detects a fluorescence image on the basis of fluorescent light emitted from the fluorescent material excited by the excitation light, and corrects shading which is density unevenness in the fluorescence image detected by the detection unit, the method comprising:

an acquisition step of acquiring a correction image signal detected by the detection unit in a state in which a flat-plate-shaped correction plate, which has a wavelength characteristic in which an excitation wavelength band and an emission wavelength band at least partially overlap an excitation wavelength band and an emission wavelength band of the fluorescent material, respectively, and has a plane size corresponding to a plurality of small regions in the image detection region, is disposed in the corresponding small region in the image detection region;

a creation step of creating a correction image on the basis of the correction image signal of each small region in the image detection region; and a correction step of performing shading correction for the fluorescence image on the basis of the correction image.

* * * * *